(12) United States Patent
Fukuchi et al.

(10) Patent No.: US 10,106,053 B2
(45) Date of Patent: Oct. 23, 2018

(54) VEHICLE

(71) Applicant: HONDA MOTOR CO., LTD., Tokyo (JP)

(72) Inventors: Masanari Fukuchi, Wako (JP); Ken Kitaori, Wako (JP); Yoshiki Nagatoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 15/460,238

(22) Filed: Mar. 16, 2017

(65) Prior Publication Data

US 2017/0282751 A1 Oct. 5, 2017

(30) Foreign Application Priority Data

Mar. 31, 2016 (JP) .................................. 2016-071886
Jun. 23, 2016 (JP) .................................. 2016-124057

(51) Int. Cl.
*B60L 15/20* (2006.01)
*B60L 11/18* (2006.01)
(Continued)

(52) U.S. Cl.
CPC .......... *B60L 15/2045* (2013.01); *B60K 6/442* (2013.01); *B60L 11/1814* (2013.01);
(Continued)

(58) Field of Classification Search
CPC ....... B60K 6/442; B60W 50/10; B60W 10/08; B60W 10/26; B60W 10/28; B60W 20/10;
(Continued)

(56) References Cited

U.S. PATENT DOCUMENTS

2008/0306643 A1* 12/2008 Hanyu ..................... B60K 6/48
701/22
2009/0026987 A1* 1/2009 Takahashi ....... B60W 30/18109
318/376
(Continued)

FOREIGN PATENT DOCUMENTS

JP       2002-271909        9/2002
JP       5477101 B2        10/2011
(Continued)

OTHER PUBLICATIONS

Japanese Office Action for corresponding JP Application No. 2016-124057, dated Jan. 23, 2018 (w/ English machine translation).

*Primary Examiner* — Mussa A Shaawat
(74) *Attorney, Agent, or Firm* — Mori & Ward, LLP

(57) ABSTRACT

A vehicle includes an electric power storage, an electric power generator, a rotating electric machine, and circuitry. The rotating electric machine is driven with electric power stored in the electric power storage and/or generated by the electric power generator to move the vehicle. The circuitry is configured to calculate target driving force for rotating electric machine, to detect surplus electric power which is generated due to a response delay of the electric power generator upon decreasing an amount of electric power generated by the electric power generator when the target driving force decreases, and to drive the rotating electric machine, when detecting the surplus electric power, with a phase current different from a maximum efficiency phase current with which an electric current value or electric power loss of the rotating electric machine is smallest so that the rotating electric machine consumes the surplus electric power.

11 Claims, 29 Drawing Sheets

(51) Int. Cl.
*B60W 20/13* (2016.01)
*B60K 6/442* (2007.10)
*B60W 50/10* (2012.01)
*B60W 10/08* (2006.01)
*B60W 10/26* (2006.01)
*B60W 10/28* (2006.01)
*B60W 20/10* (2016.01)

(52) U.S. Cl.
CPC .......... *B60W 10/08* (2013.01); *B60W 10/26* (2013.01); *B60W 10/28* (2013.01); *B60W 20/10* (2013.01); *B60W 50/10* (2013.01); *B60W 2540/10* (2013.01); *B60W 2540/106* (2013.01); *B60Y 2400/202* (2013.01); *Y02T 10/6234* (2013.01); *Y02T 10/7258* (2013.01); *Y02T 90/34* (2013.01); *Y10S 903/93* (2013.01)

(58) Field of Classification Search
CPC ......... B60W 2540/10; B60W 2540/106; B60L 15/2045; B60L 11/1814; B60Y 2400/202
See application file for complete search history.

(56) References Cited

U.S. PATENT DOCUMENTS

| | | | | |
|---|---|---|---|---|
| 2009/0125172 | A1* | 5/2009 | Matsubara | B60W 10/06 701/22 |
| 2010/0248054 | A1* | 9/2010 | Umayahara | H01M 8/04089 429/432 |
| 2012/0292919 | A1* | 11/2012 | Suzuki | B60K 6/48 290/380 |
| 2013/0316871 | A1* | 11/2013 | Shiiba | B60W 10/08 477/15 |
| 2015/0006000 | A1* | 1/2015 | Kawata | B60K 6/48 701/22 |
| 2017/0197610 | A1* | 7/2017 | Sato | B60K 6/365 |

FOREIGN PATENT DOCUMENTS

| | | |
|---|---|---|
| JP | 2012-213253 | 11/2012 |
| JP | 5631826 B2 | 4/2013 |
| JP | WO2016-038689 | 3/2016 |

* cited by examiner

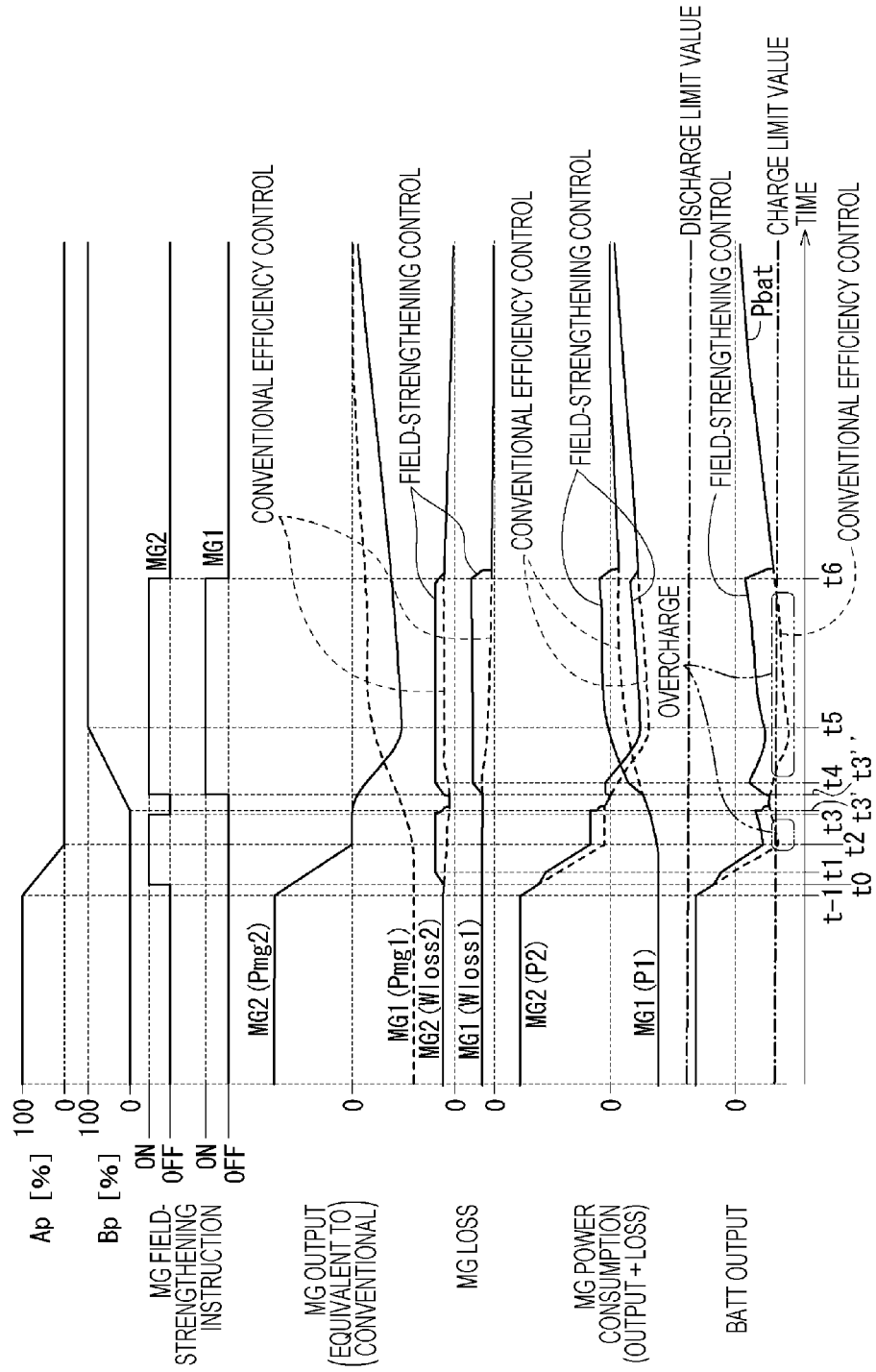

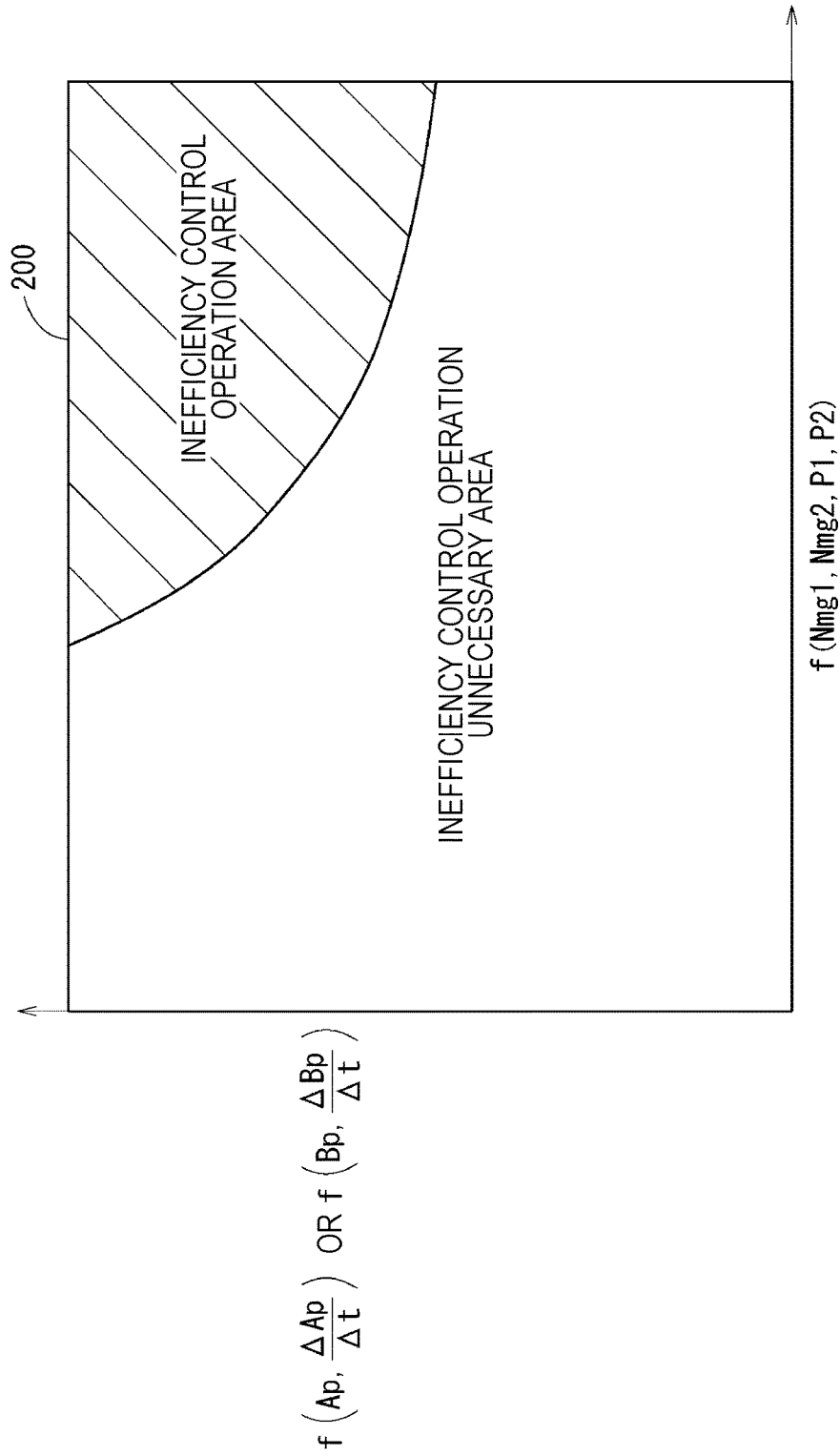

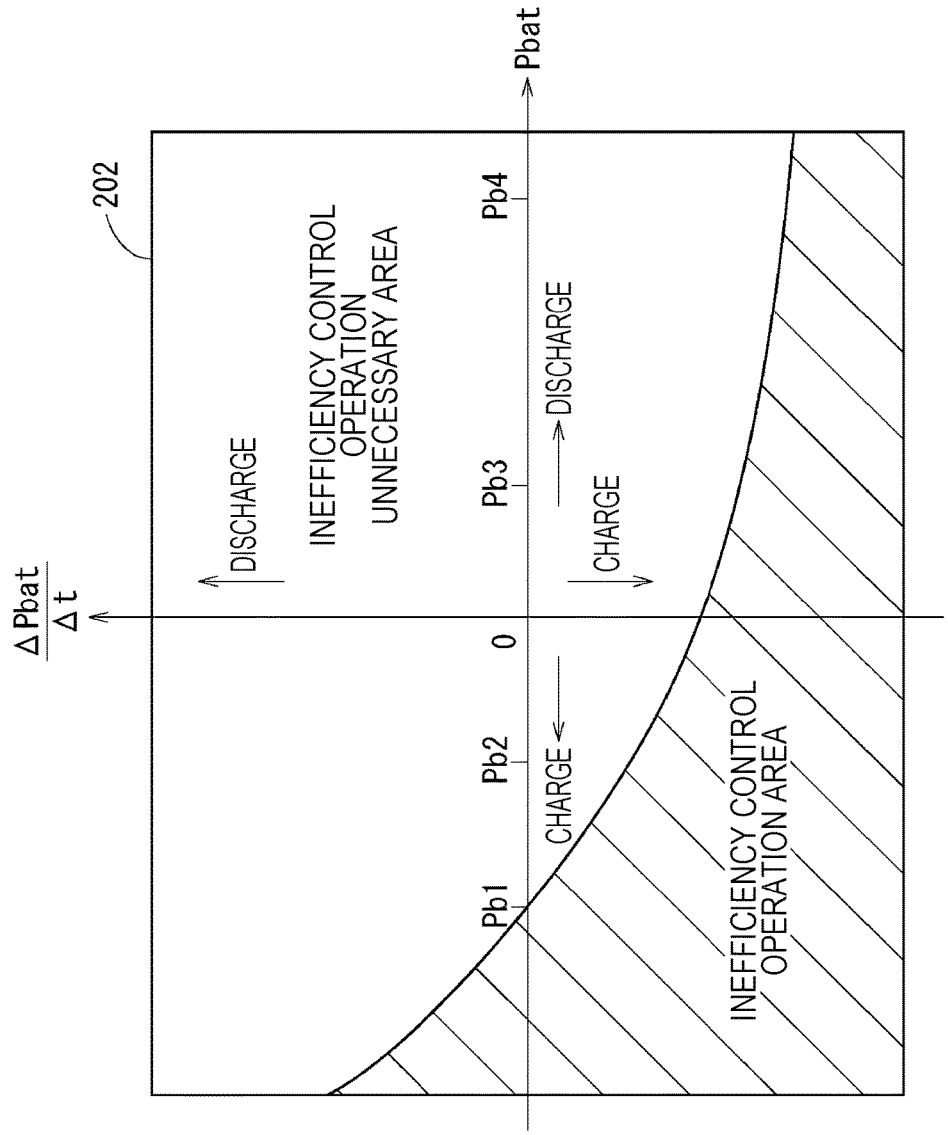

TIME =t1 (MG1 OPERATING POINT)

TIME =t1 (MG2 OPERATING POINT)

TIME=t2 (MG1 OPERATING POINT)

TIME=t2 (MG2 OPERATING POINT)

TIME = t6 (MG2 OPERATING POINT)

TIME = t6 (MG1 OPERATING POINT)

VEHICLE

CROSS-REFERENCE TO RELATED APPLICATIONS

The present application claims priority under 35 U.S.C. § 119 to Japanese Patent Applications No. 2016-071886 and No. 2016-124057, filed Mar. 31, 2016 and Jun. 23, 2016, respectively, entitled "Vehicle Including Power Generation Device." The contents of these applications are incorporated herein by reference in their entirety.

BACKGROUND

1. Field

The present disclosure relates to a vehicle.

2. Description of the Related Art

An FCV including an FC mounted therein as a power generation device may be used under a situation where an output requested by a load (an electric motor that drives driving wheels) to the FC through an operation of an accelerator pedal or the like frequently fluctuates.

Under such a usage situation where the output requested by the load frequently fluctuates, the output may rapidly increase. In this case, the following issue arises.

For example, a time (response time) to when an actual output power value of the FC reaches an output power value corresponding to the output requested by the load may delay (response delay), and the output power value supplied to the load may be insufficient during the response delay. No. 2002-271909 suggests an FC system in which an output of a secondary cell compensates for an output of an FC when such an issue arises (see paragraph [0047] and FIG. 7 of the publication).

According to Japanese Patent No. 5477101, when such an issue arises, an FC converter for increasing the voltage of an FC is stopped and the FC is directly connected to an input terminal of a high-voltage inverter, so that the voltage at the terminal of the FC becomes an input voltage at the terminal of the inverter which is higher than an open-circuit voltage of the FC. As a result, no surplus voltage is generated in the FC (see paragraph [0031] and FIG. 4 of the patent).

According to Japanese Patent No. 5631826, when an output requested by a load rapidly decreases, the voltage of an FC is fixed by an FC converter and the air and/or fuel supplied to the FC is decreased to decrease surplus power in the FC, so as to avoid degradation of the FC (see paragraph 50 of the patent).

SUMMARY

According to one aspect of the present disclosure, there is provided a vehicle including a power storage device, a power generation device, a rotating electric machine that is driven by power stored in the power storage device and/or power generated by the power generation device, and a control device that controls the power generation device and the rotating electric machine. When surplus power is generated due to a response delay of the power generation device in a case of decreasing an amount of power generated by the power generation device in response to detection of a decrease in driving force requested by the vehicle to the rotating electric machine, the control device causes the rotating electric machine to consume the surplus power by driving the rotating electric machine using a phase current different from a phase current that causes a current value or loss to be smallest at a time of generating a predetermined driving force.

According to another aspect of the present disclosure, a vehicle includes an electric power storage, an electric power generator, a rotating electric machine, and circuitry. The rotating electric machine is driven with electric power stored in the electric power storage and/or generated by the electric power generator to move the vehicle. The circuitry is configured to calculate target driving force for rotating electric machine, to detect surplus electric power which is generated due to a response delay of the electric power generator upon decreasing an amount of electric power generated by the electric power generator when the target driving force decreases, and to drive the rotating electric machine, when detecting the surplus electric power, with a phase current different from a maximum efficiency phase current with which an electric current value or electric power loss of the rotating electric machine is smallest so that the rotating electric machine consumes the surplus electric power.

According to further aspect of the present disclosure, a method for controlling a vehicle includes calculating target driving force for the rotating electric machine to move the vehicle. Electric power stored in an electric power storage and/or generated by an electric power generator is supplied to the rotating electric machine with a maximum efficiency phase current with which an electric current value or electric power loss of the rotating electric machine is smallest. Surplus electric power, which is generated due to a response delay of the electric power generator upon decreasing an amount of electric power generated by the electric power generator, is detected when the target driving force decreases. The rotating electric machine is driven, when detecting the surplus electric power, with a phase current different from the maximum efficiency phase current so that the rotating electric machine consumes the surplus electric power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 21 is a second time chart for describing the operation of inefficiency control of the vehicle according to the second embodiment.

FIG. 22 is a first characteristic diagram for judging whether or not to perform inefficiency control.

FIG. 23 is a second characteristic diagram for judging whether or not to perform inefficiency control.

DESCRIPTION OF THE EMBODIMENTS

Figure 1:
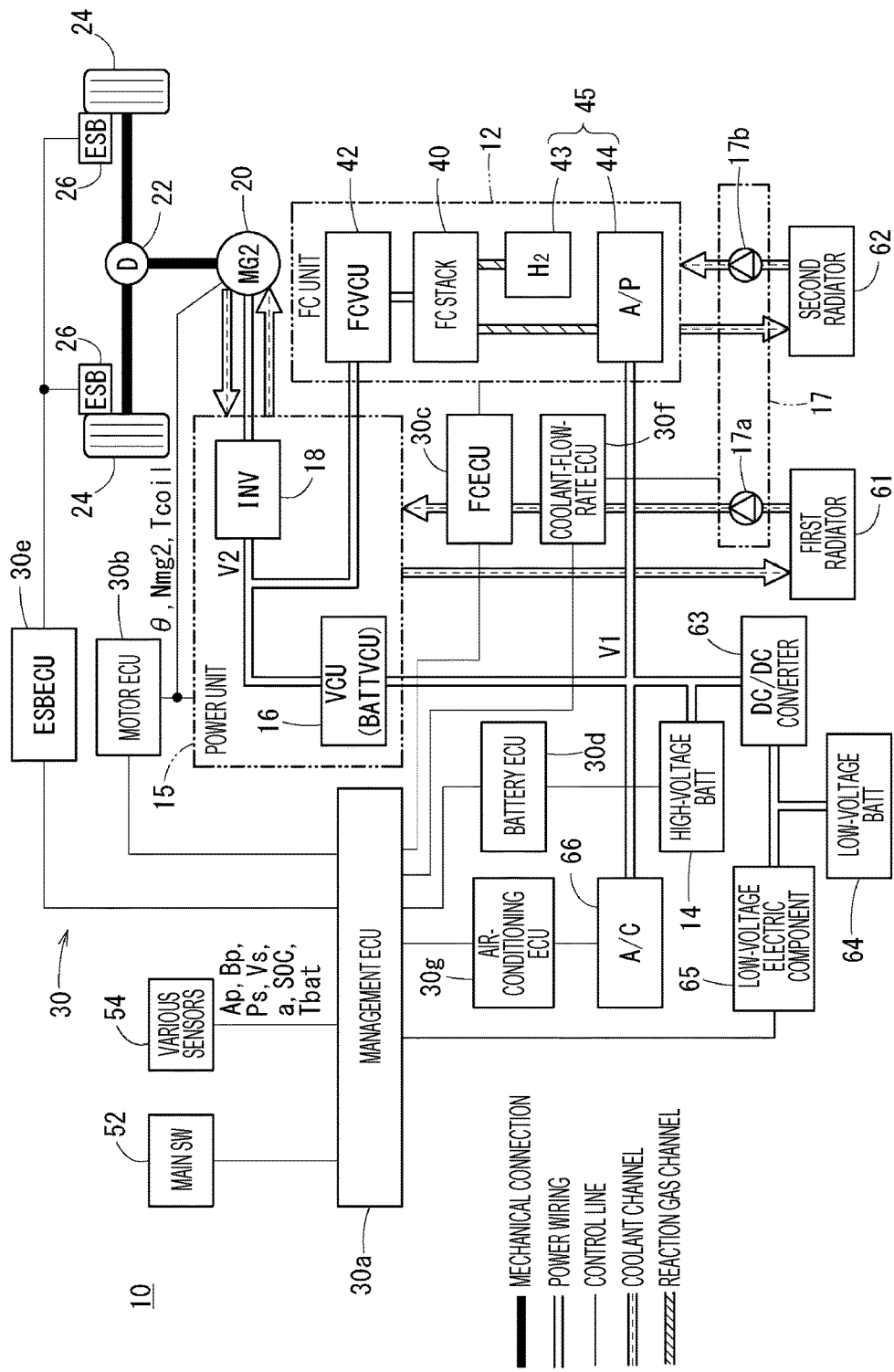
FIG. 1 is a block diagram illustrating a schematic configuration of a vehicle (fuel cell vehicle) according to a first embodiment.

The embodiments will now be described with reference to the accompanying drawings, wherein like reference numerals designate corresponding or identical elements throughout the various drawings.

Hereinafter, preferred embodiments of a vehicle will be described in detail with reference to the attached drawings.

First Embodiment

Configuration

FIG. 1 is a block diagram illustrating a schematic configuration of a vehicle 10 according to a first embodiment.

The vehicle 10 basically includes a fuel cell (FC) unit 12, a high-voltage battery (high-voltage BATT) 14 serving as a power storage device (an electric power storage), a power unit 15, a pump unit 17, a motor generator 20 serving as a rotating electric machine, a reduction gear (D) 22, wheels (driving wheels) 24, electronic servo brakes (ESBs) 26, and a control device 30. The wheels 24 are driven by the motor generator 20 serving as a driving motor through the reduction gear 22.

The power unit 15 includes a voltage control unit (VCU (BATTVCU)) 16 and an inverter (INV) 18.

A voltage V1, which is a terminal voltage of the high-voltage battery 14, is decreased to a low voltage of +12 V by a DC/DC converter 63 and is applied to a low-voltage electric component 65 and a low-voltage battery (low-voltage BATT) 64.

In FIG. 1, a bold solid line represents a mechanical connection, a double solid line represents power wiring, a solid line represents a control line (including a signal line), a double solid line with a broken line at the center represents a coolant channel, and a hatched double solid line represents a reaction gas channel. The area of the power unit 15 and the area of the FC unit 12 encompassed by a two-dot chain line represent, for convenience, areas that are cooled by coolant.

The control device 30 is formed of a plurality of electronic control units (ECUs). The ECUs include a management ECU 30a serving as a centralized control device, a motor ECU 30b serving as a motor generator control device, an FCECU 30c serving as a fuel cell control device, a battery ECU 30d serving as a power storage device control device, an electronic servo brake ECU (ESBECU) 30e serving as a brake control device, a coolant-flow-rate ECU 30f serving as a coolant circulation control device, and an air-conditioning ECU 30g serving as an air-conditioning control device. The individual ECUs 30a to 30g are connected to one another through communication lines, so that data are shared with one another and control signals are transmitted to and received from one another.

The management ECU 30a switches between a driving state and a stopping state (soak state) of the vehicle 10 in response to receipt of an ON/OFF signal from a main switch 52 (which is a power switch and corresponds to an ignition switch of an internal-combustion-engine vehicle), and obtains signals from various sensors 54 so as to control individual loads and the low-voltage electric component 65 through the other ECUs 30b to 30g in a centralized manner.

The various sensors 54 include a position sensor that outputs an accelerator position Ap corresponding to the depression of an accelerator pedal by a driver, a depression degree sensor that outputs a brake depression degree Bp corresponding to the depression of a brake pedal by the driver, a shift position sensor that outputs a shift position Ps of a shift lever, a vehicle speed sensor that outputs a vehicle speed Vs, an acceleration sensor that outputs an acceleration a of the vehicle 10, a state of charge (SOC) sensor that outputs a state of charge SOC of the high-voltage battery 14, and a battery temperature sensor that detects a temperature of the high-voltage battery 14 (battery temperature Tbat). Actually, the SOC sensor and the battery temperature sensor are provided in the high-voltage battery 14, and the input/output power, battery voltage Vbat=V1, and battery temperature Tbat of the high-voltage battery 14 are transmitted to the management ECU 30a through the battery ECU 30d.

The motor ECU 30b performs vector control on the motor generator 20, which is a permanent magnet synchronous motor (rotating electric machine) having a three-phase interior permanent magnet structure. In the case of performing control, the motor ECU 30b obtains a rotation position θ and a motor rotation rate Nmg2 from a rotation sensor provided in the motor generator 20 and a coil temperature Tcoil from a coil temperature sensor.

The FCECU 30c controls power generation of the FC unit 12 and so forth. The battery ECU 30d controls charging/discharging of the high-voltage battery 14 and so forth. The ESBECU 30e brakes the vehicle 10 using an oil pressure through the ESBs 26 in accordance with the brake depression degree Bp. The air-conditioning ECU 30g controls an air-conditioning temperature of an electrically operated air compressor (A/C) 66 and so forth.

The coolant-flow-rate ECU 30f controls driving of a first pump 17a and a second pump 17b that form the pump unit 17. When the first pump 17a is driven, coolant that has been cooled by a first radiator 61 using natural ventilation circulates while cooling the power unit 15 and the motor generator 20. When the second pump 17b is driven, coolant that has been cooled by a second radiator 62 using natural ventilation through driving circulates while cooling the FC unit 12.

The FC unit 12 includes a fuel cell stack (FC stack) 40, a fuel cell voltage control unit (FCVCU) 42, a fuel ($H_2$) tank 43, and an air pump (A/P) 44. The fuel tank 43 and the air pump 44 form a reaction gas source 45.

The FC stack 40 has, for example, a stacked structure of a fuel cell, which is formed by sandwiching a solid polymer electrolyte film between an anode electrode and a cathode electrode. The FCVCU 42 increases a fuel cell voltage (FC voltage) Vfc to a voltage V2 and supplies the increased voltage to a DC side of the inverter 18 (the high-voltage side of the VCU 16).

The high-voltage battery 14 includes a plurality of storage cells connected in series and outputs, for example, the voltage V1, which is a high voltage of 100 to 300 V. The storage cells are, for example, cells of a lithium-ion battery or nickel hydride battery. The high-voltage battery 14 may be a capacitor.

The VCU (BATTVCU) 16 increases the voltage V1, which is an output voltage of the high-voltage battery 14, to the voltage V2. Also, the VCU 16 decreases the voltage V2 to the voltage V1. That is, the VCU 16 functions as a step-up/down converter (bidirectional voltage converter) between the high-voltage battery 14 and each of the inverter 18 (motor generator 20) and the FC unit 12 (FCVCU 42).

Figure 2:
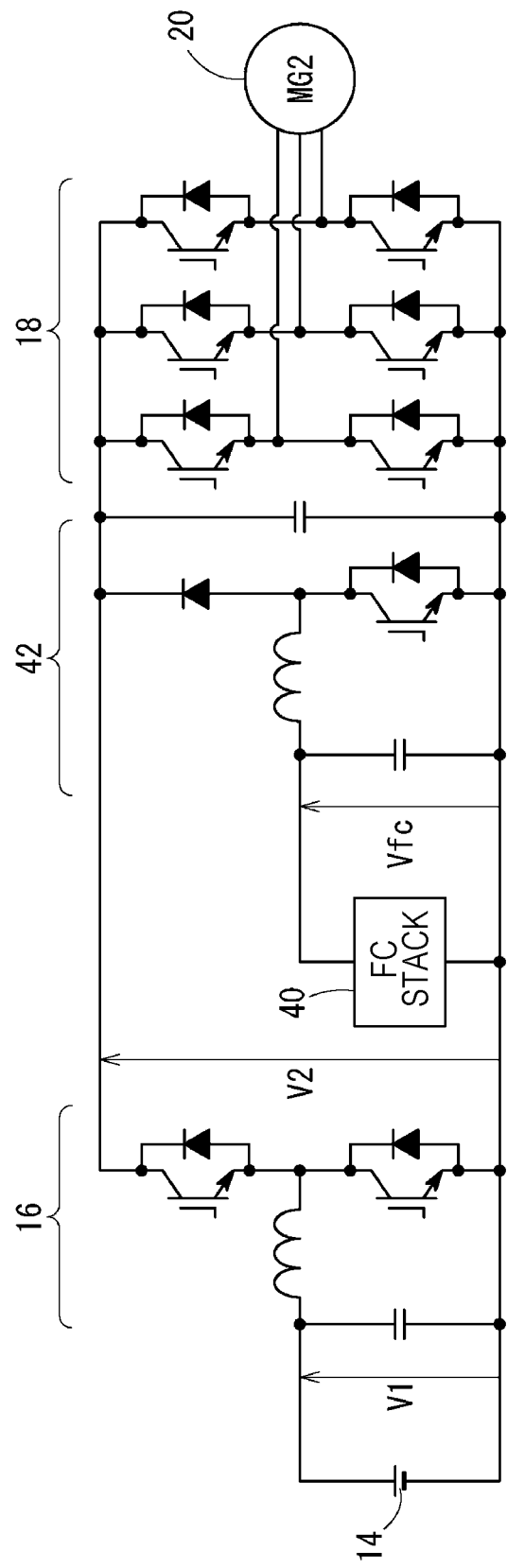
FIG. 2 is an electric circuit diagram illustrating a detailed example configuration of a VCU, an FCVCU, and an inverter illustrated in FIG. 1.

FIG. 2 is an electric circuit diagram illustrating the connection relationship among the high-voltage battery 14, the FC unit 12, the VCU (BATTVCU) 16, the FCVCU 42, the inverter 18, and the motor generator 20.

As illustrated in FIG. 2, the VCU 16 includes a smoothing capacitor, an inductor, and two switching elements of upper and lower arms. The VCU 16 performs ON/OFF switching of the two switching elements of upper and lower arms by using the voltage V1 output by the high-voltage battery 14 as an input voltage, and thereby increases the voltage V1 (battery voltage) to the voltage V2 (output voltage) that is higher than the voltage V1 under the control of the motor ECU 30b.

Also, the VCU 16 performs ON/OFF switching of the two switching elements of upper and lower arms by using, as an input voltage, the voltage V2 that is output by the inverter 18 at the time of a regenerative operation of the motor generator 20 and/or the voltage V2 that is the output voltage of the FCVCU 42, and thereby decreases the voltage V2 to the voltage V1 (output voltage) that is lower than the voltage V2.

When ON/OFF switching of the two switching elements of the VCU 16 is not performed and when the upper switching element is in an ON state whereas the lower switching element is in an OFF state, the VCU 16 is in a direct connection state and the voltage V2 becomes equal to the voltage V1.

The FCVCU 42 includes a smoothing capacitor, an inductor, a lower-arm switching element, and a diode on the output side. The FCVCU 42 performs ON/OFF switching of the lower-arm switching element by using the FC voltage Vfc output by the FC stack 40 as an input voltage and thereby increases the FC voltage Vfc to the voltage V2 higher than the FC voltage Vfc under the control of the FCECU 30c. The FCVCU 42 operates only as a booster.

The inverter 18 converts the voltage V2 to an AC voltage and supplies a three-phase current to the motor generator 20 under the control of the motor ECU 30b (powered operation). Also, the inverter 18 converts an AC voltage generated by the motor generator 20 to the voltage V2 at the time of braking the vehicle 10 (regenerative operation).

Description of Basis of Inefficiency Control (Field-Strengthening Control)

Now, a description will be given of the meaning and basic effect of inefficiency control of the motor generator 20 of the vehicle 10 according to an embodiment of the present disclosure.

Figure 3:
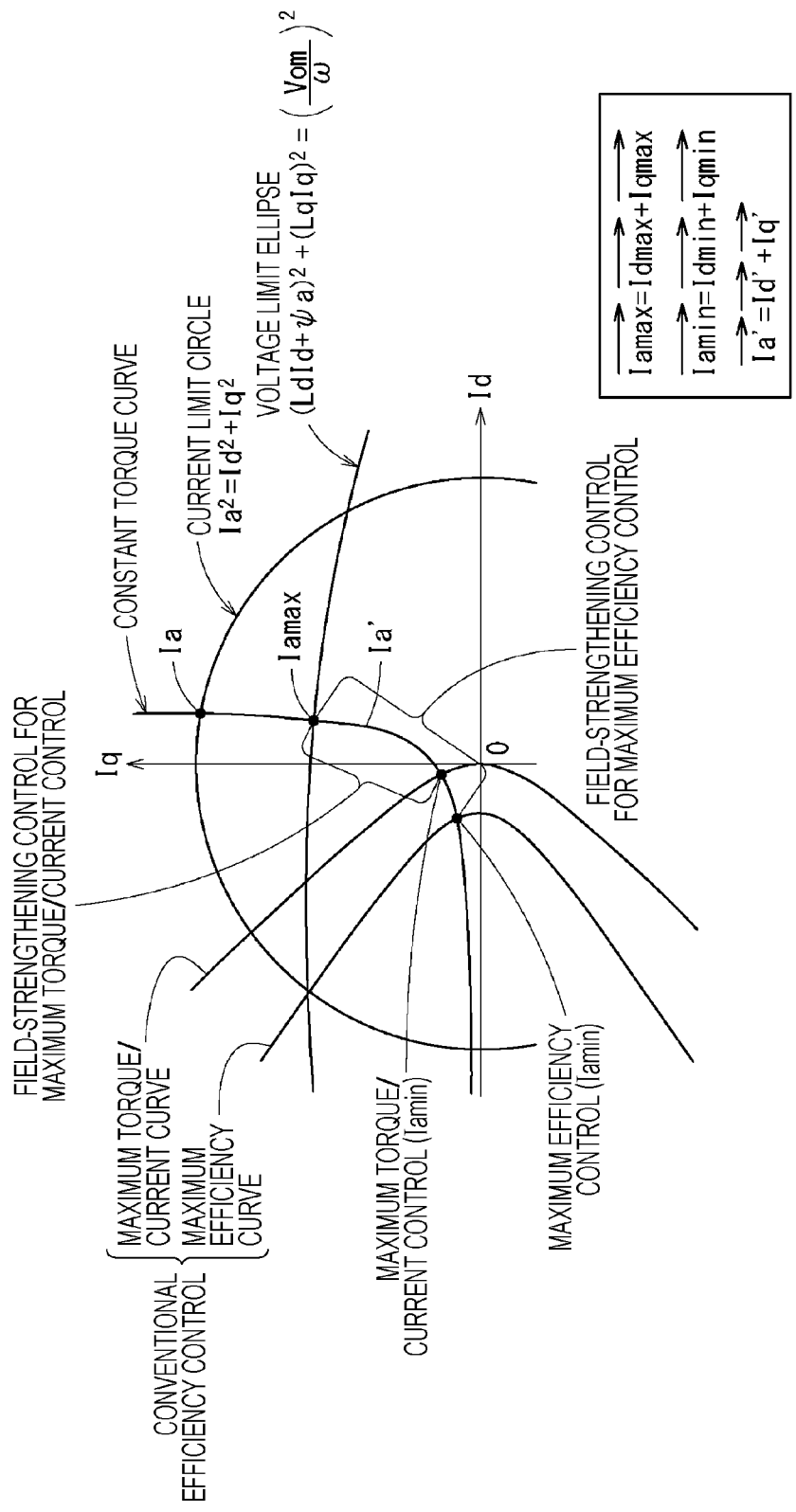
FIG. 3 is an Id-Iq plane diagram for describing inefficiency control in field-strengthening control.

With reference to FIG. 3, a description will be given of an operating point in inefficiency control. A representative method of conventional efficiency control in a current vector control method is maximum torque/current control or maximum efficiency control. Specifically, maximum torque/current control is a method for controlling a motor so that a current value at the time of generating a predetermined driving force is the smallest. On the other hand, maximum efficiency control is a method for controlling a motor so that loss at the time of generating a predetermined driving force is the smallest.

Inefficiency control is control for driving the motor generator 20 by using a phase current Ia' (Iamin<Ia'≤Iamax), which is different from a phase current used for maximum torque/current control or maximum efficiency control, that is, a phase current Iamin (d-axis current Idmin, q-axis current Iqmin) that causes a current value or loss to be smallest at the time of generating a predetermined driving force (the torque represented by the constant torque curve in FIG. 3).

In the example illustrated in FIG. 3, the largest phase current Iamax (d-axis current Idmax, q-axis current Iqmax) that may be adopted in inefficiency control has a value on a voltage limit ellipse, the details of which will be described below.

Inefficiency control, in which the value of the d-axis current Id is larger in the positive direction than the value of the d-axis current Idmin in conventional efficiency control (a positive value in general), is also referred to as field-strengthening control. As illustrated in FIG. 3, field-strengthening control includes field-strengthening control for maximum torque/current control (field-strengthening control in a section from an intersection point between a maximum torque/current curve and a constant torque curve to an intersection point between a voltage limit ellipse and the constant torque curve) and field-strengthening control for maximum efficiency control (field-strengthening control in a section from an intersection point between a maximum efficiency curve and the constant torque curve to an intersection point between the voltage limit ellipse and the constant torque curve).

As shown in the rectangular frame in the lower-right portion in FIG. 3, the phase current Iamin (vector) here represents a composite vector of the d-axis current Idmin which is a d-axis component vector and the q-axis current Iqmin which is a q-axis component vector. All the other currents shown in the rectangular frame represent vectors.

The values of the d-axis current Id and the q-axis current Iq that form the phase current Ia' in inefficiency control are limited by the following expression (1) on the powered operation (Iq>0) side and are limited by the following expression (2) on the regenerative operation (Iq<0) side (described below with reference to the drawings).

Powered operation side Ia'

$$Id\text{min}(<0)<Id'\le Id\text{max}(>0)$$

$$Iq\text{min}(>0)<Iq'\le Iq\text{max}(>0) \quad (1)$$

Regenerative operation side Ia' (not illustrated: a figure that is line-symmetric to the d-axis relative to the powered operation side)

$$Id\text{min}(<0)<Id'\le Id\text{max}(>0)$$

$$Iq\text{min}(<0)>Iq'\ge Iq\text{max}(<0) \quad (2)$$

In FIG. 3, the current limit circle will be described below.

A description has been given of the basis of an operating point of inefficiency control. As can be understood from expressions (1) and (2), inefficiency control, in which field control is strengthened relative to field control according to conventional efficiency control by increasing the d-axis current Id in the positive direction within the range where operation is possible (in FIG. 3, a common range of the current limit circle and the voltage limit ellipse), is also referred to as field-strengthening control. In field-strengthening control, copper loss and iron loss or the sum of copper loss and iron loss is increased compared to conventional efficiency control, and control is performed to cause the motor generator 20 to consume surplus power when the surplus power is generated.

Description of Details of Inefficiency Control (Field-Strengthening Control

Next, a description will be given of a method for determining the operating point of the motor generator 20 on the dq-axis coordinates and the voltage V2 applied to the motor generator 20 in the case of performing inefficiency control.

The range of the operating point of the motor generator 20 is restricted by the maximum phase current Ia (see FIG. 3) that can be supplied to the motor generator 20 and the voltage V2 (DC terminal voltage of the inverter 18) applied to the motor generator 20.

The amplitudes of the currents (d-axis current Id, q-axis current Iq) of the motor generator 20 are restricted by the maximum phase current Ia, and thus need to satisfy the following expression (3) (current limit circle).

$$Id^2+Iq^2\le Ia^2 \quad (3)$$

Note that Id represents a d-axis current, Iq represents a q-axis current, and Ia represents a maximum phase current.

The induced voltages (Vd, Vq) of the motor generator 20 are expressed by the following expression (4). Normally, expression (4) is expressed in a matrix form.

$$Vd=0\times Id+(-\omega Lq)\times Iq+0$$

$$Vq=(\omega Ld)\times Id+0Iq+\omega\psi a \quad (4)$$

Note that ω represents an angular speed of the motor generator 20, Lq represents a q-axis inductance, Ld represents a d-axis inductance, and wa represents a flux linkage (magnetic flux).

On the basis of expression (4), a dq induced voltage (the magnitude of the vector sum of the induced voltage Vd generated in a d-axis armature and the induced voltage Vq generated in a q-axis armature) Vo is expressed by the following expression (5).

$$Vo=(Vd^2+Vq^2)^{1/2}=\omega\{(LdId+\psi a)^2+(LqIq)^2\}^{1/2} \quad (5)$$

Here, the limit voltage of the voltage V2 illustrated in FIGS. 1 and 2 (the output voltage of the VCU 16 and the DC terminal (input terminal) voltage of the inverter 18) is represented by Vom. The limit voltage Vom is determined by the voltage V2, and the relational expression thereof is expressed by the following expression (6) in which k represents a constant determined by the modulation method of switching control of the VCU 16.

$$Vom=kV2 \quad (6)$$

Thus, the dq induced voltage Vo needs to be equal to or lower than the limit voltage Vom, as expressed by the following expression (7).

$$Vo\le Vom \quad (7)$$

That is, on the basis of expressions (5) and (7), the range of the operating point of the motor generator 20 is restricted by voltage and thus needs to satisfy the following expression (8) (voltage limit ellipse).

$$(LdId+\psi a)^2+(LqIq)^2\le(Vom/\omega)^2 \quad (8)$$

As described above, the current restriction of the operation of the motor generator 20 is expressed by expression (3).

Figure 4:
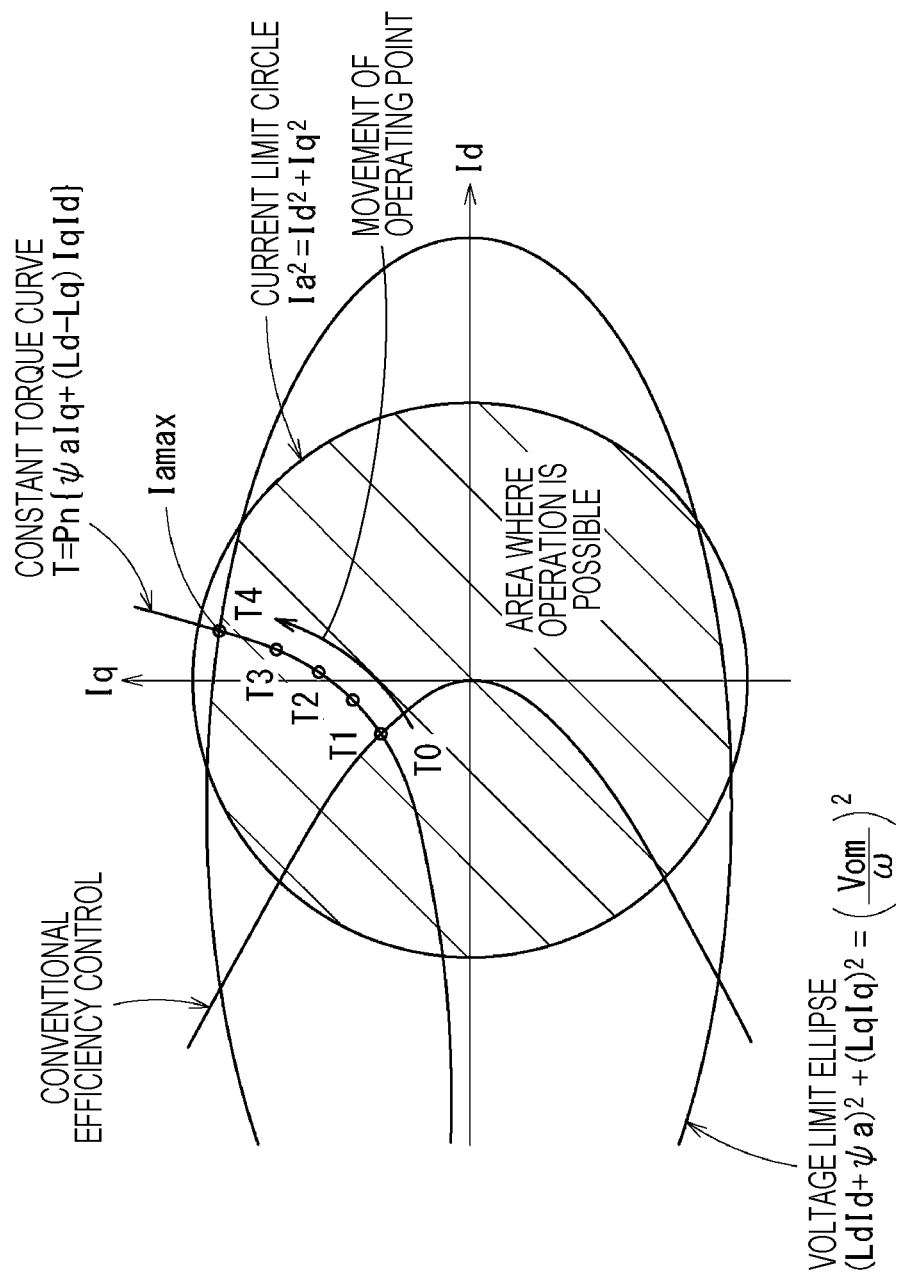
FIG. 4 is an Id-Iq plane diagram for describing conventional efficiency control and inefficiency control in powered operation.

FIG. 4 is an Id-Iq plane diagram (dq coordinates) illustrating movements of an operating point as an example of powered operation (similar to FIG. 3).

Figure 5:
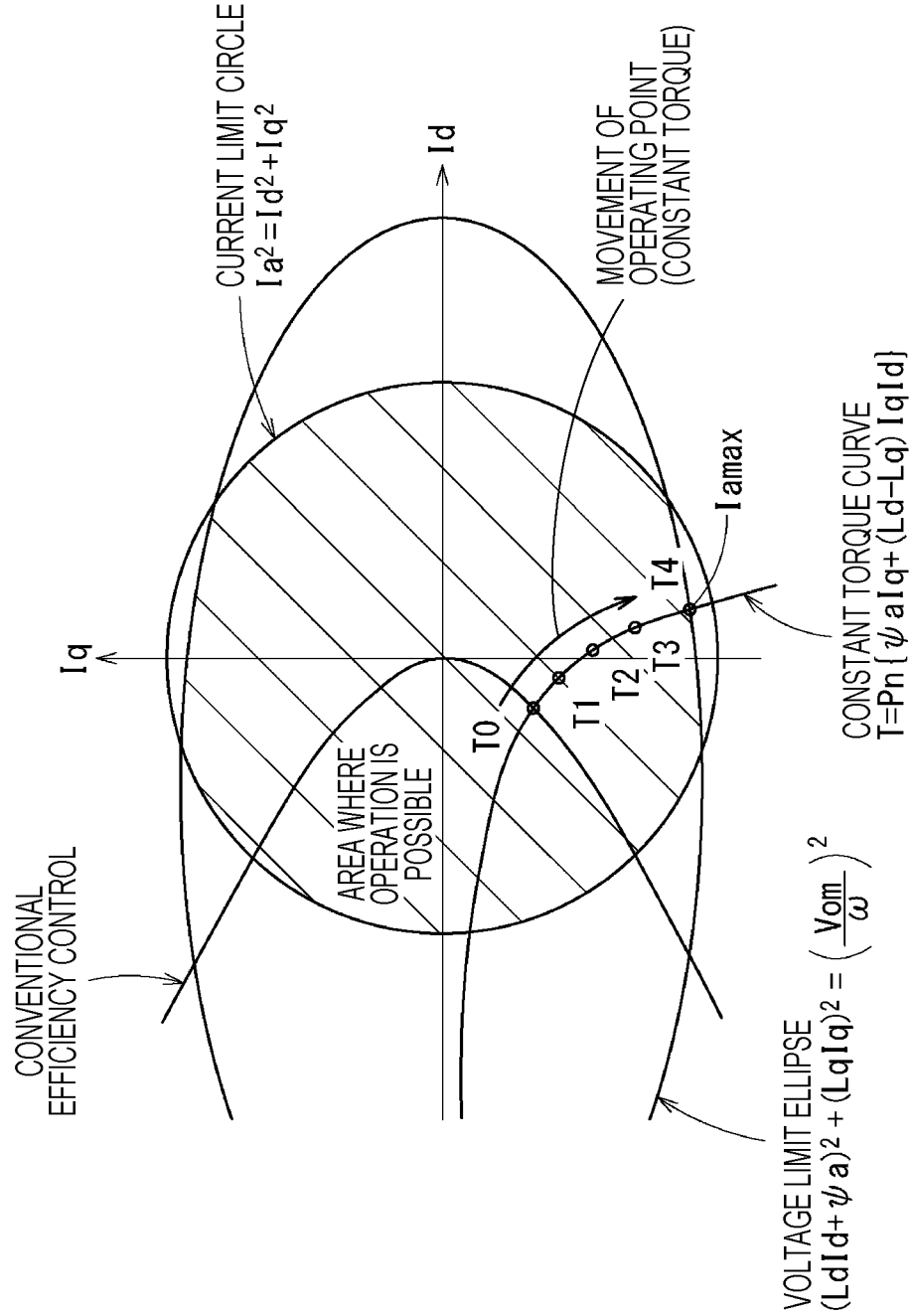
FIG. 5 is an Id-Iq plane diagram for describing conventional efficiency control and inefficiency control in regenerative operation.

FIG. 5 is an Id-Iq plane diagram (dq coordinates) illustrating movements of an operating point as an example of regenerative operation.

Expression (3) is expressed by the internal area of the current limit circle ($Ia^2=Id^2+Iq^2$) in the dq-axis current vector space illustrated in FIGS. 4 and 5.

On the other hand, the voltage restriction of the operation of the motor generator 20 is expressed by expression (8). Expression (8) is expressed by the internal area of the voltage limit ellipse $\{(LdId+\omega a)^2+(LqIq)^2=(Vom/\omega)^2\}$ in the dq-axis current vector space illustrated in FIGS. 4 and 5. Thus, the range of the current that can be supplied to the motor generator 20 is a range satisfying expressions (3) and (8). This range is represented by the hatched area in FIGS. 4 and 5.

Furthermore, the torque T of the motor generator 20 is expressed by the following expression (9).

$$T=Pn\{\omega aIq+(Ld-Lq)IdIq\} \quad (9)$$

Note that Pn represents the number of pole pairs of the motor generator 20. The first term of the right side represents the torque caused by permanent magnet, and the second term of the right side represents a reluctance torque.

Expression (9) is solved regarding the q-axis current Iq to obtain a constant torque curve (also referred to as a constant torque line, an equal torque line, or an equal torque curve), which is expressed by the following expression (10).

$$Iq=T/[Pn\{\psi aIq+(Ld-Lq)Id\}] \quad (10)$$

Expression (10) expresses a hyperbola whose asymptote is expressed by Id=ψa/(Lq−Ld), Iq=0.

In the case of the induced voltages Vd and Vq in expression (4), the constant torque curve is a hyperbola. In the case of the d-axis current Id and the q-axis current Iq when an armature wire-wound resistance Ra is considered, power is supplied to compensate for a torque reduction caused by loss, and thus the constant torque curve based on Id and Iq does not become a hyperbola.

A copper loss Wc of the motor generator 20 is given by the following expression (11) in which Ra represents an armature wire-wound resistance. An iron loss Wf is given by the following expression (12) in which Rc represents an equivalent iron loss resistance. A loss (power consumption in inefficiency control) Wloss is given by the following expression (13). An output Pmg is given by the following expression (14). A power consumption P of the motor generator 20 is given by the following expression (15). An efficiency η is given by the following expression (16).

$$Wc = RaIa^2 = Ra(Id^2 + Iq^2) \quad (11)$$

$$Wf = (Vd^2 + Vq^2)/Rc \quad (12)$$

$$Wloss = Wc + Wf \quad (13)$$

$$Pmg = T\omega/Pn \text{(generated torque} \times \text{angular speed/number of pole pairs)} \quad (14)$$

$$P = Pmg + Wloss = Pmg + Wc + Wf \quad (15)$$

$$\eta = Pmg/P \quad (16)$$

As described above with reference to FIG. 3, in control of the operating point of the motor generator 20 where inefficiency control is not performed (conventional efficiency control), for example, maximum torque/current control in which the generated torque is maximum with respect to current (control in which the tangent to the constant torque curve at the operating point is orthogonal to a current vector) or maximum efficiency control in which loss including not only copper loss but also iron loss is minimized (the operating point is in a leading phase compared to maximum torque/current control, that is, the d-axis current Id is more likely to be moved in the negative direction) is performed (see FIG. 3).

As illustrated in FIGS. 4 and 5, the motor generator 20 is driven on the curve (operating point) of conventional efficiency control (maximum torque/current control), for example, on an operating point T0, in a normal case.

On the other hand, when inefficiency control is necessary, the voltage V2 (limit voltage Vom) to be applied to the motor generator 20 may be increased or the angular speed ω may be decreased according to necessity in order to perform field-strengthening control to increase the d-axis current Id of the motor generator 20 in the positive direction as indicated by, for example, operating points T1, T2, T3, and T4 as illustrated in FIGS. 4 and 5.

That is, as can be understood from expression (8), an increase in the voltage V2 (limit voltage Vom) to be applied to the motor generator 20 or a decrease in the angular speed ω enables the amplitude of the current (Id, Iq) of the motor generator 20 to be increased and the operating point of the motor generator 20 to be moved because the d-axis inductance Ld, the flux linkage ψa, and the q-axis inductance Lq are constant. Note that, since the angular speed ω depends on the driving state of the vehicle 10, the voltage limit ellipse can be expanded and the operation range can be expanded by actually increasing the voltage V2 (limit voltage Vom).

In a motor generator MG1 functioning as a power generator in the example illustrated in FIG. 15 (described below), the angular speed ω may be changed.

When the limit voltage Vom of the voltage V2 is high and the angular speed ω of the motor generator 20 is low, the area of the voltage limit ellipse is large and thus the amplitude of the current (Id, Iq) of the motor generator 20 is easily increased. Thus, inefficiency control of the motor generator 20 can be efficiently performed by appropriately controlling the limit voltage Vom of the voltage V2 and the angular speed ω of the motor generator 20. Note that, in the case of the motor generator 20, the angular speed ω is determined by a target vehicle speed as described above, and thus the voltage V2 (limit voltage Vom) is controlled.

Description of Operation According to First Embodiment

A detailed description will be given of a specific example of inefficiency control (inefficiency drive) of the vehicle 10 (FCV) illustrated in FIG. 1 with reference to the flowchart in FIG. 6 executed by the control device 30, basically by the management ECU 30*a*.

In step S1, the control device 30 obtains a vehicle state, specifically, a shift position Ps (for example, a drive D position and a drive B position), a vehicle speed Vs, and an acceleration a from the shift position sensor, the vehicle speed sensor, and the acceleration sensor in the various sensors 54, respectively. Also, the control device 30 estimates the grade of a road by using a method according to the related art (may obtain a road grade by using a grade sensor).

Subsequently, in step S2, the control device 30 obtains an amount of operation, that is, an accelerator position Ap and a brake depression degree Bp, which are amounts of operation of an accelerator pedal and a brake pedal in the various sensors 54.

Subsequently, in step S3, the control device 30 calculates a target driving force of the wheels 24 corresponding to the vehicle state and the amount of operation.

Subsequently, in step S4, the control device 30 calculates the output Pmg of the motor generator 20 corresponding to the target driving force with reference to the diameters of the wheels 24 and the reduction ratio of the reduction gear 22.

Subsequently, in step S5, the control device 30 calculates a power consumption P of the motor generator 20 (see expression (15)).

Subsequently, in step S6, the control device 30 obtains a power consumption Paux of auxiliary machines. Here, the power consumption Paux of auxiliary machines is the total power consumption of the air compressor 66, the air pump 44, the first and second pumps 17*a* and 17*b*, and the low-voltage electric component 65.

Subsequently, in step S7, the control device 30 obtains a generated power (FC power) Pfc of the FC stack 40.

Subsequently, in step S8, the control device 30 calculates a DC terminal power predicted value of the high-voltage battery 14 (high-voltage battery terminal power predicted value) Pbate by using the following expression (17). In expression (17), the power flowing into the high-voltage battery 14 (charging power) is represented by —whereas the power flowing out of the high-voltage battery 14 (discharging power) is represented by +.

$$Pbate = P - Pfc + Paux \quad (17)$$

Pbate represents the high-voltage battery terminal power predicted value, P represents the power consumption of the motor generator 20, Pfc represents the generated power, and Paux represents the power consumption of the auxiliary machines.

Subsequently, in step S9, the control device 30 calculates an acceptable power Pbatin (charge limit value) of the high-voltage battery 14.

Figure 7:
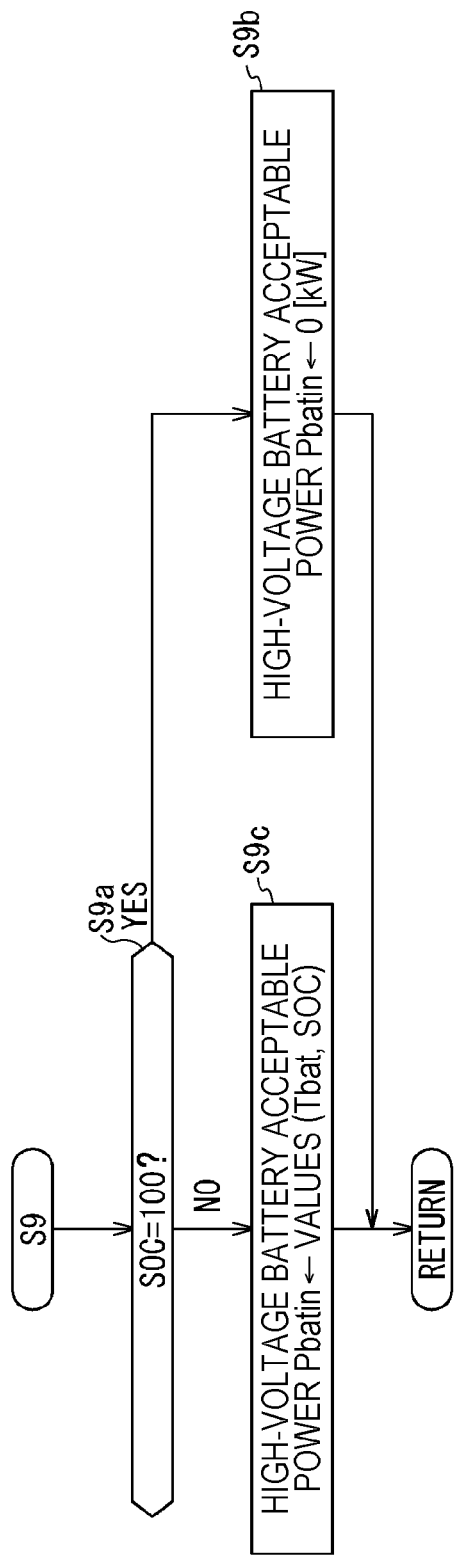
FIG. 7 is a flowchart illustrating the details of step S9 in the flowchart in FIG. 6.

FIG. 7 is a flowchart illustrating the details of step S9.

Figure 8:
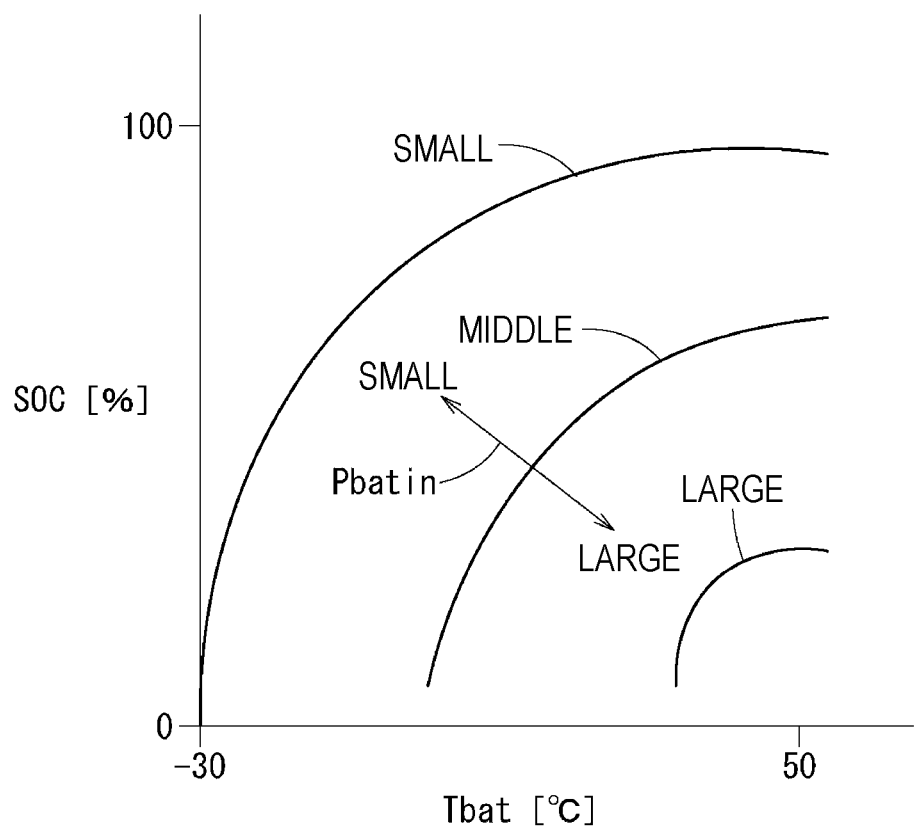
FIG. 8 is a characteristic diagram illustrating a battery acceptable power.

FIG. 8 illustrates the characteristics (map) provided for calculating the acceptable power Pbatin of the high-voltage battery 14.

In step S9a, the control device 30 judges whether or not the state of charge SOC detected by the SOC sensor is 100%. If the state of charge SOC is 100% (YES in step S9a), the process proceeds to step S9b, where the battery acceptable power Pbatin is determined to be 0 kW.

On the other hand, if the state of charge SOC is less than 100% (NO in step S9a), the process proceeds to step S9c, where the control device 30 obtains the battery acceptable power Pbatin with reference to the characteristics (map) illustrated in FIG. 8 in which the state of charge SOC and the battery temperature Tbat (for example, from about −30° C. to about +50° C.) are input values. The characteristics are created in advance, in which, for example, the battery acceptable power Pbatin increases as the battery temperature Tbat increases in the same state of charge SOC, and the battery acceptable power Pbatin increases as the state of charge SOC decreases in the same battery temperature Tbat.

Subsequently, in step S10, the control device 30 judges whether or not the high-voltage battery terminal power predicted value Pbate is larger than the high-voltage battery acceptable power Pbatin.

If the high-voltage battery terminal power predicted value Pbate is equal to or smaller than the high-voltage battery acceptable power Pbatin (NO in step S10, Pbate≤Pbatin), the high-voltage battery 14 is charged with all the power calculated as the high-voltage battery terminal power predicted value Pbate in expression (17).

In this case, the management ECU 30a executes power generation control of the FC (FC stack 40) in the FC unit 12 through the FCECU 30c in step S11.

On the other hand, if it is judged in step S10 that the high-voltage battery terminal power predicted value Pbate is larger than the high-voltage battery acceptable power Pbatin (YES in step S10, Pbate>Pbatin), the control device 30 determines to cause the motor generator 20 to consume the surplus power Psp, which is a difference expressed by expression (18), by performing the above-described inefficiency control, so as to avoid overcharge (charging beyond the charge limit value) of the high-voltage battery 14.

$$Psp = Pbate - Pbatin \quad (18)$$

If it is judged that inefficiency control needs to be performed (YES in step S10), the process proceeds to step S12, where the control device 30 calculates an MG inefficiency area power consumption Pine and an ESB share power Pesv.

Figure 9:
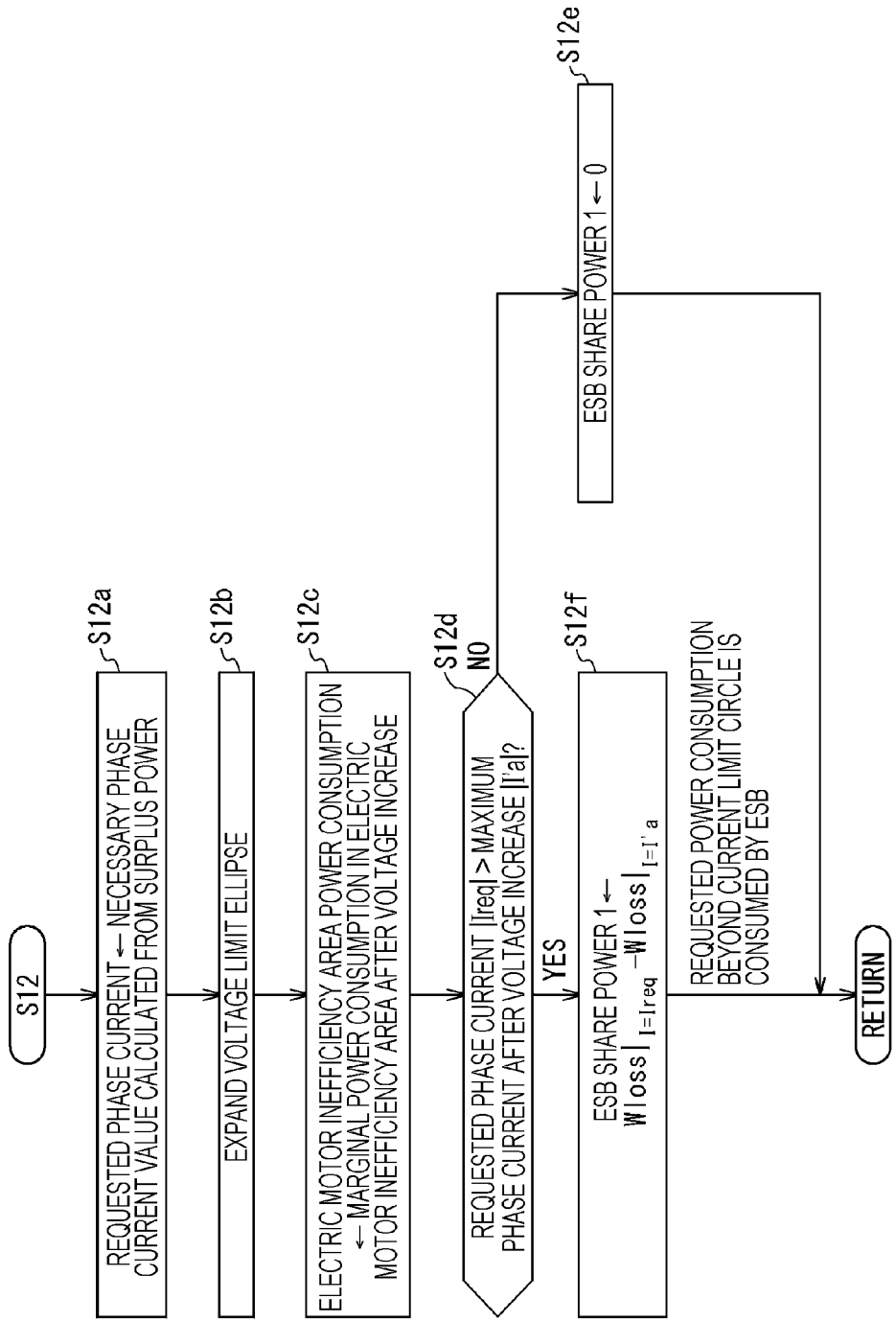
FIG. 9 is a flowchart illustrating the details of step S12 in the flowchart in FIG. 6.

FIG. 9 is a flowchart illustrating the details of step S12.

In step S12a, the control device 30 regards a necessary phase current value calculated from the surplus power Psp as a requested phase current Ireq.

Figure 10:
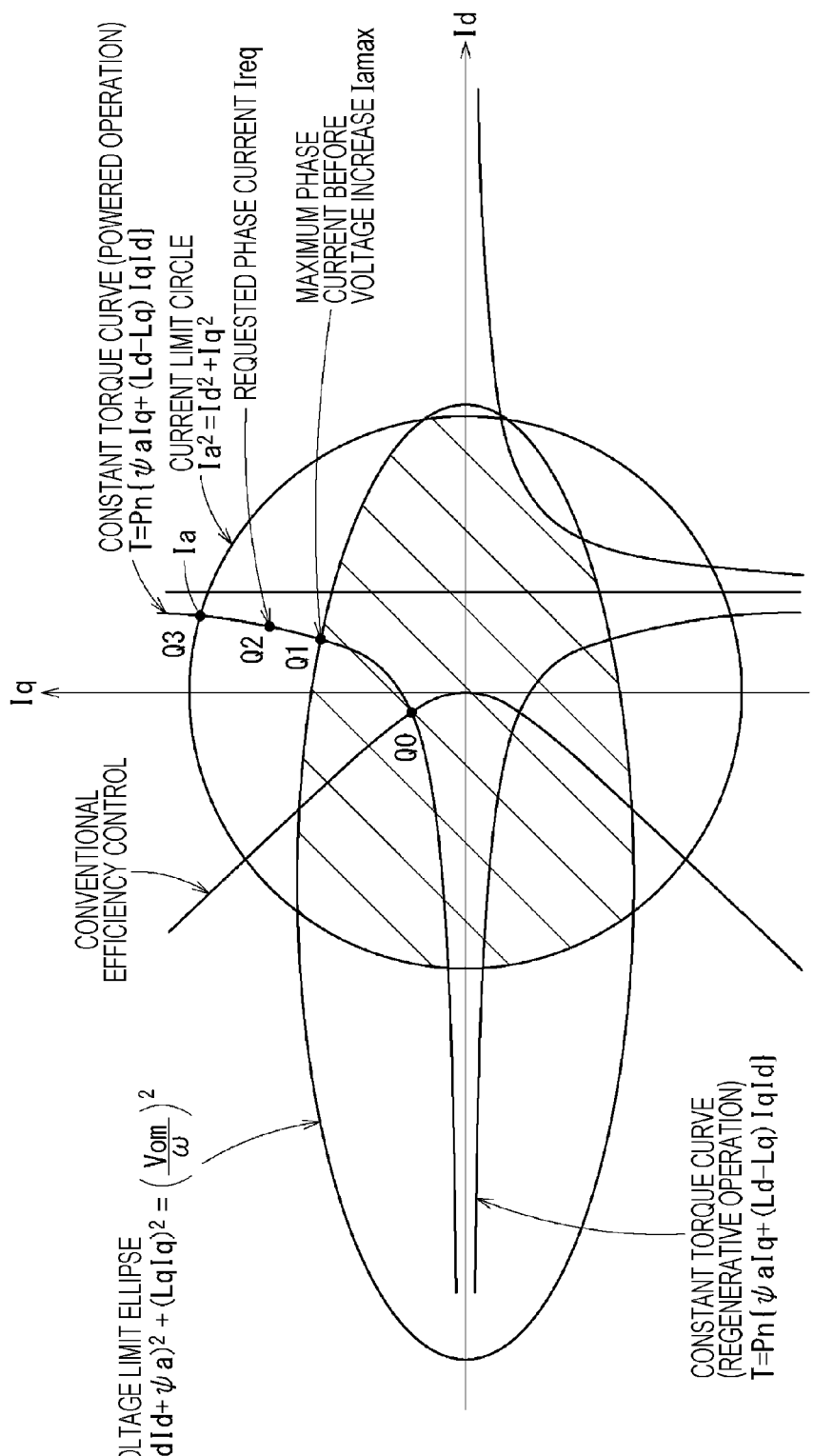
FIG. 10 is an Id-Iq plane diagram for describing inefficiency control when a requested phase current is larger than a maximum phase current before voltage increase.

As illustrated in FIG. 10, if the requested phase current Ireq is larger than a maximum phase current before voltage increase Iamax, the limit voltage Vom related to the voltage V2 is increased to a limit voltage V'om by the VCU 16 and the voltage limit ellipse is expanded as expressed by the following expression (8') in step S12b so that the requested phase current Ireq can be acquired.

$$(LdId + \psi a)^2 + (LqIq)^2 = (V'om/\omega)^2 \quad (8')$$

Subsequently, in step S12c, the control device 30 sets the marginal power consumption in an electric motor inefficiency area after voltage increase to an electric motor inefficiency area power consumption Pine.

Furthermore, in step S12d, the control device 30 compares the magnitudes (absolute values) of the requested phase current Ireq and the maximum phase current after voltage increase I'a and judges whether or not |Ireq|>|I'a|.

If the magnitude of the requested phase current Ireq is smaller than or equal to the magnitude of the maximum phase current after voltage increase I'a (NO in step S12d), the power shared by the ESBs 26 is not necessary, and thus the ESB share power 1 is set to 0 in step S12e.

Figure 11:
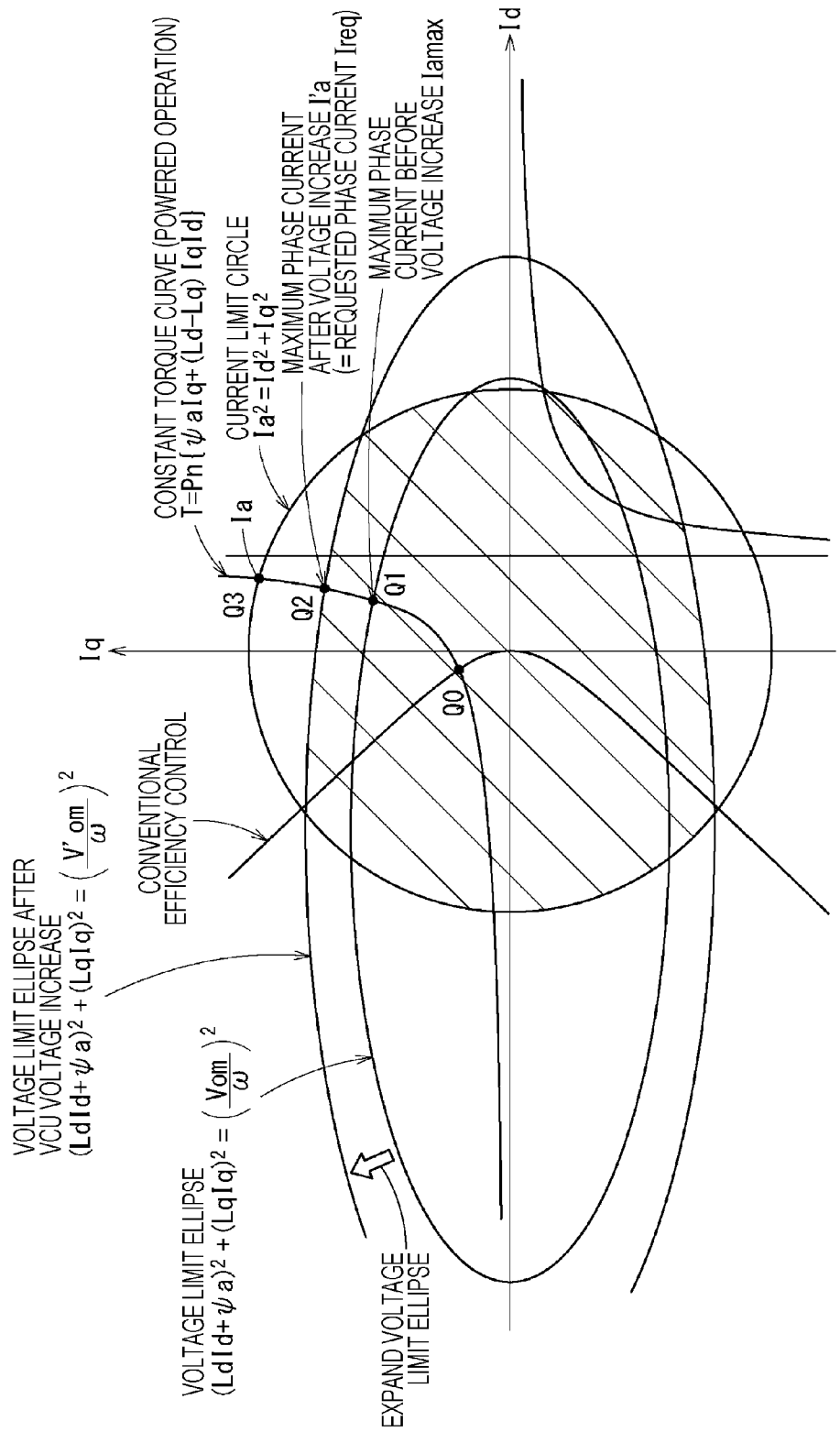
FIG. 11 is an Id-Iq plane diagram for describing expansion of a voltage limit ellipse when a requested phase current is equal to a maximum phase current after voltage increase.

In this case, as illustrated in FIG. 11, the voltage limit ellipse expressed by expression (8) is expanded to the voltage limit ellipse after voltage increase of VCU, which is expressed by expression (8'), by increasing the voltage of the VCU 16 (increasing the voltage V2 so that the limit voltage Vom becomes the limit voltage V'om) so as to ensure that the requested phase current Ireq=I'a.

In this case, in step S13, the operating point (intersection point) Q1 of the maximum phase current before voltage increase Iamax is changed to the intersection point Q2 of the maximum phase current after voltage increase I'a on the constant torque curve in the further field-strengthening direction (in the direction of further increasing the positive value of the d-axis current Id) so that the surplus power Psp can be consumed as heat through inefficiency control of the motor generator 20 (further change of the operating point of the electric motor to the field-strengthening area (inefficiency area)).

On the other hand, if it is judged in step S12d that the magnitude of the requested phase current Ireq is larger than the magnitude of the maximum phase current after voltage increase I'a (YES in step S12d), the power shared by the ESBs 26 is necessary. Thus, in step S12f, the control device 30 sets the ESB share power 1 to $Wloss|_{I=Ireq} - Wloss|_{I=I'a} = Preq - P'a$ (=power loss caused by requested phase current Ireq−power loss caused by maximum phase current after voltage increase I'a).

Figure 12:
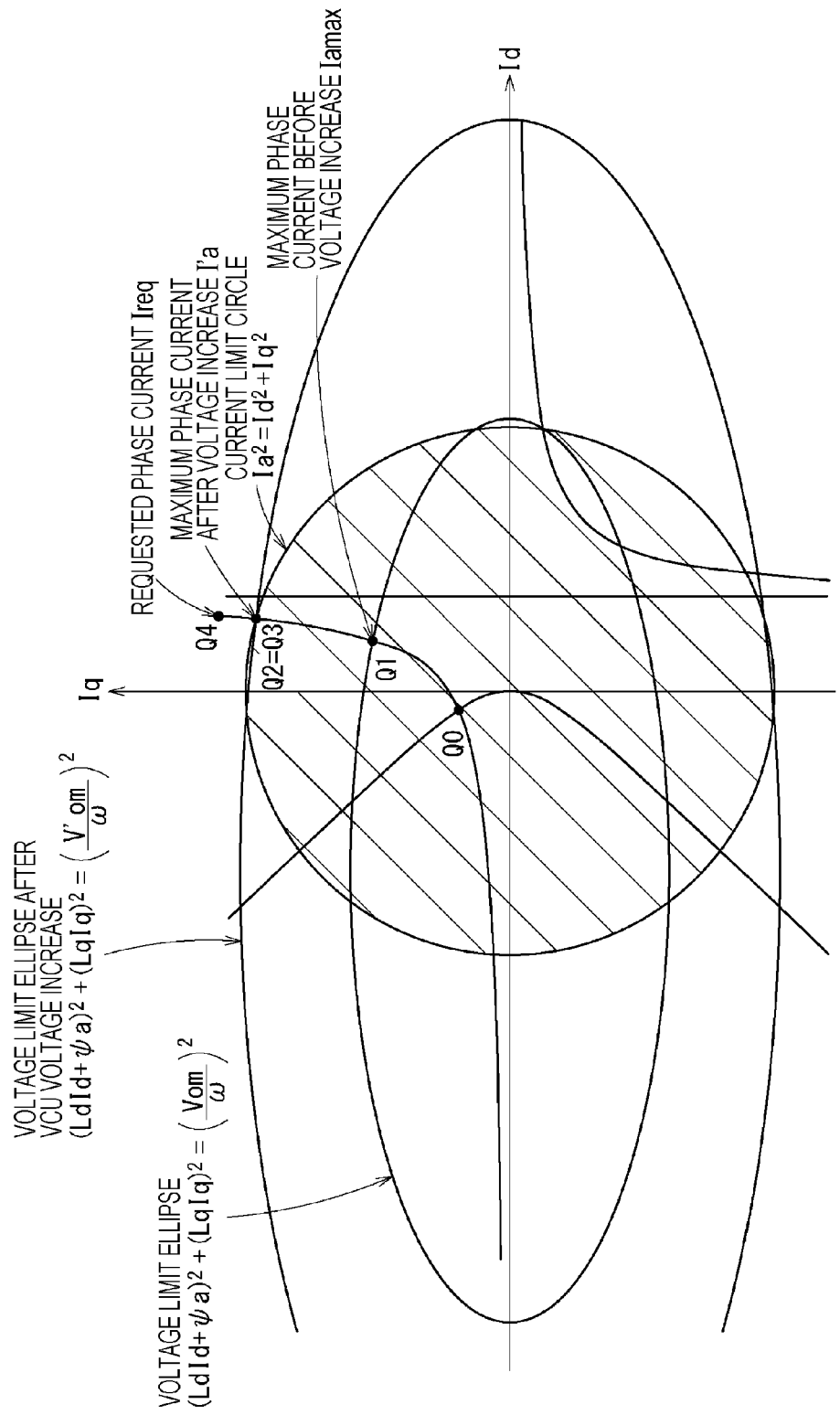
FIG. 12 is an Id-Iq plane diagram for describing expansion of a voltage limit ellipse when a requested phase current is larger than a maximum phase current after voltage increase.

In this case, in step S13, the voltage limit ellipse after VCU voltage increase expressed by expression (8') may be expanded to the range that crosses the current limit circle, which is the capacity limit of the power unit 15 (VCU 16+INV 18), as illustrated in FIG. 12.

The voltage limit ellipse is not necessarily expanded to the range that crosses the current limit circle. It is not possible to expand the voltage limit ellipse to the range that crosses the current limit circle depending on the angular speed ω and the limit of voltage increase of the VCU 16. In a case where expansion is possible, it is not necessary to expand it to the range that crosses the current limit circle or larger.

At this time, the intersection point Q1 of the maximum phase current before voltage increase Iamax is changed in the further field-strengthening direction (in the direction of further increasing the positive value of the d-axis current Id) to the intersection point Q2=Q3 of the maximum phase current after voltage increase I'a on the constant torque curve so that the surplus power Psp can be consumed as heat through inefficiency control of the motor generator 20. Here, the requested power from the intersection point Q3 to the intersection point Q4 expressed by $Wloss|_{I=Ireq} -$ Wloss$|_{I=I'max}$=Preq−P'max (=power loss caused by requested phase current Ireq−power loss caused by maximum phase current after voltage increase I'a) is regarded as the ESB share power 1 and is consumed by the ESBs 26. As a result, a braking force of the ESBs 26 is added to a regenerative braking force of the motor generator 20.

Subsequently, in step S11, the control device 30 performs power generation control of the FC stack 40.

Figure 13:
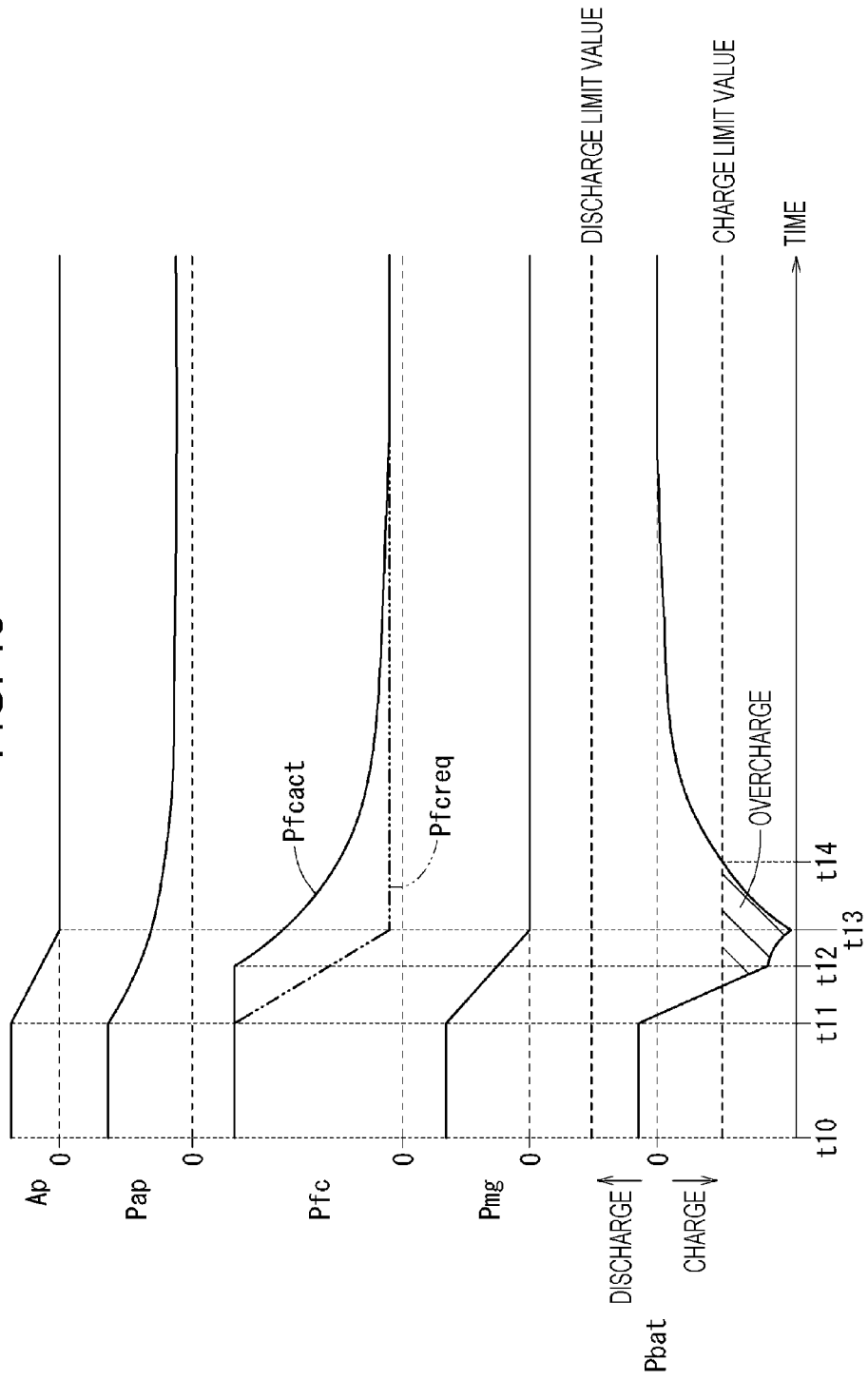
FIG. 13 is a time chart for describing a comparative example of the first embodiment.
Figure 14:
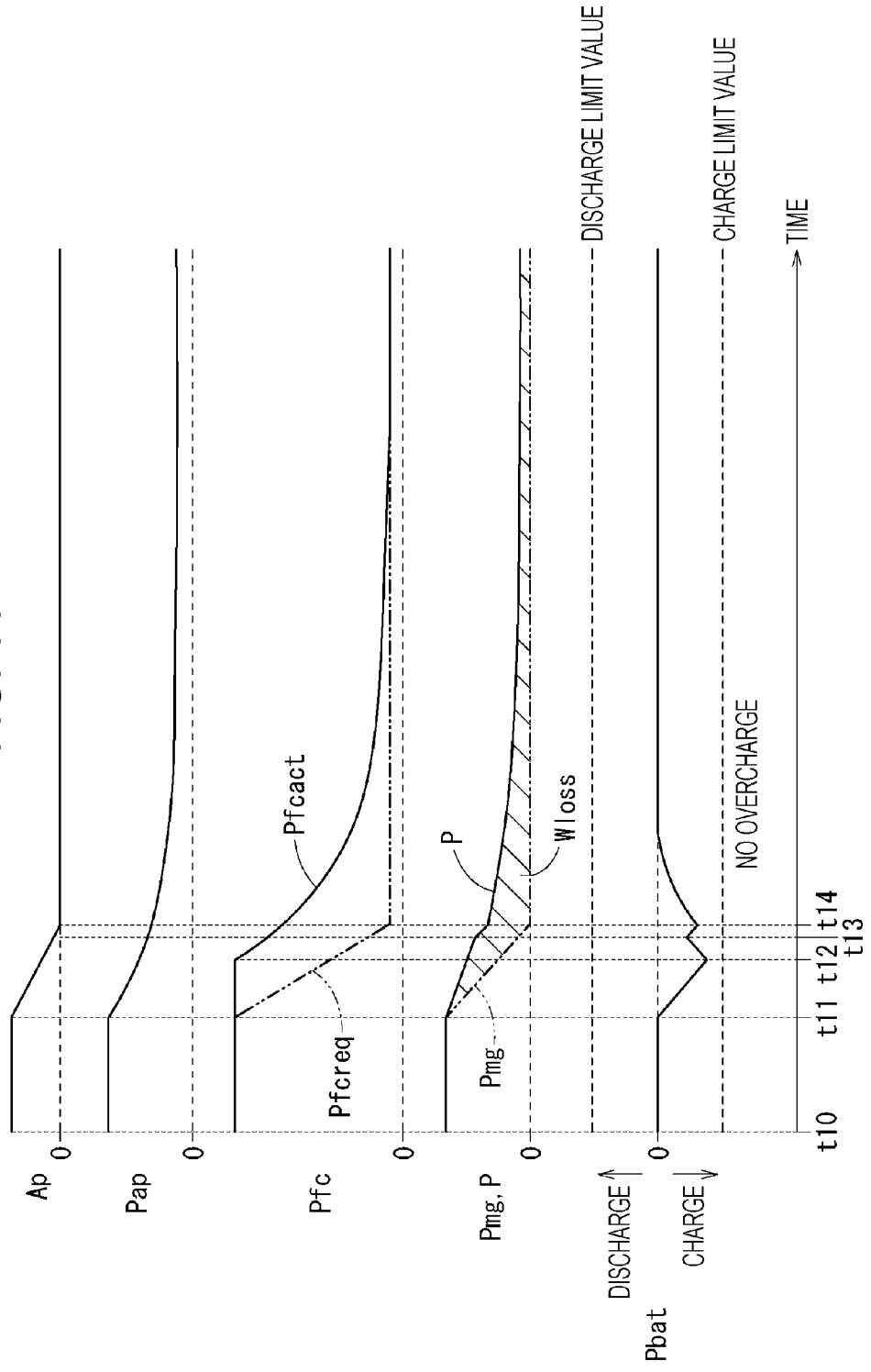
FIG. 14 is a time chart for describing an operation according to the first embodiment.

Description of Operation According to First Embodiment with Reference to Time Charts FIG. 13 is a time chart of an FCV according to a comparative example. FIG. 14 is a time chart of the vehicle 10 according to the first embodiment.

When the accelerator pedal is released by the driver (when the accelerator position Ap changes from a predetermined value toward 0 value) at time t11 in FIG. 13, the generated power Pfc is decreased as a requested generated power (requested FC power) Pfcreq from time t11 to time t13 as the output Pmg of the motor generator 20 is decreased. However, since the air pump 44 has inertia, a time delay occurs in an air pump output Pap, and the generated power does not rapidly decrease but gradually decreases to the rotation rate (flow rate) corresponding to the requested value of the generated power Pfc.

Thus, a generated power (FC power) Pfcact, which is an actual measured value of the generated power Pfc, generates constant power until time t12 when the internal state of the FC stack 40 is changed, and gradually decreases from time t12.

Accordingly, the battery terminal power Pbat, which is the battery terminal power of the high-voltage battery 14, exceeds the charge limit value and an overcharge state occurs. In this case, the high-voltage battery 14 may be damaged.

In contrast, in the vehicle 10 according to the first embodiment, when the accelerator pedal is released by the driver and the accelerator position Ap is changed from a predetermined value toward 0 value at time t11, the output Pmg of the motor generator 20 is decreased to satisfy vehicle requirements, as illustrated in the time chart in FIG. 14.

In this case, the power excessively generated by the FC stack 40 is consumed through inefficiency control starting from time t11 so that the battery terminal power Pbat of the high-voltage battery 14 does not exceed the charge limit value (so that overcharge does not occur) from time t11, with the power consumption P of the motor generator 20 being a value corresponding to the sum of the output Pmg and a loss (power consumption by inefficiency control) Wloss (Wc+Wf). Accordingly, overcharge of the high-voltage battery 14 is prevented. Note that the period from time t10 to time t14 is a period of about several seconds or less.

Second Embodiment

Configuration

Figure 15:
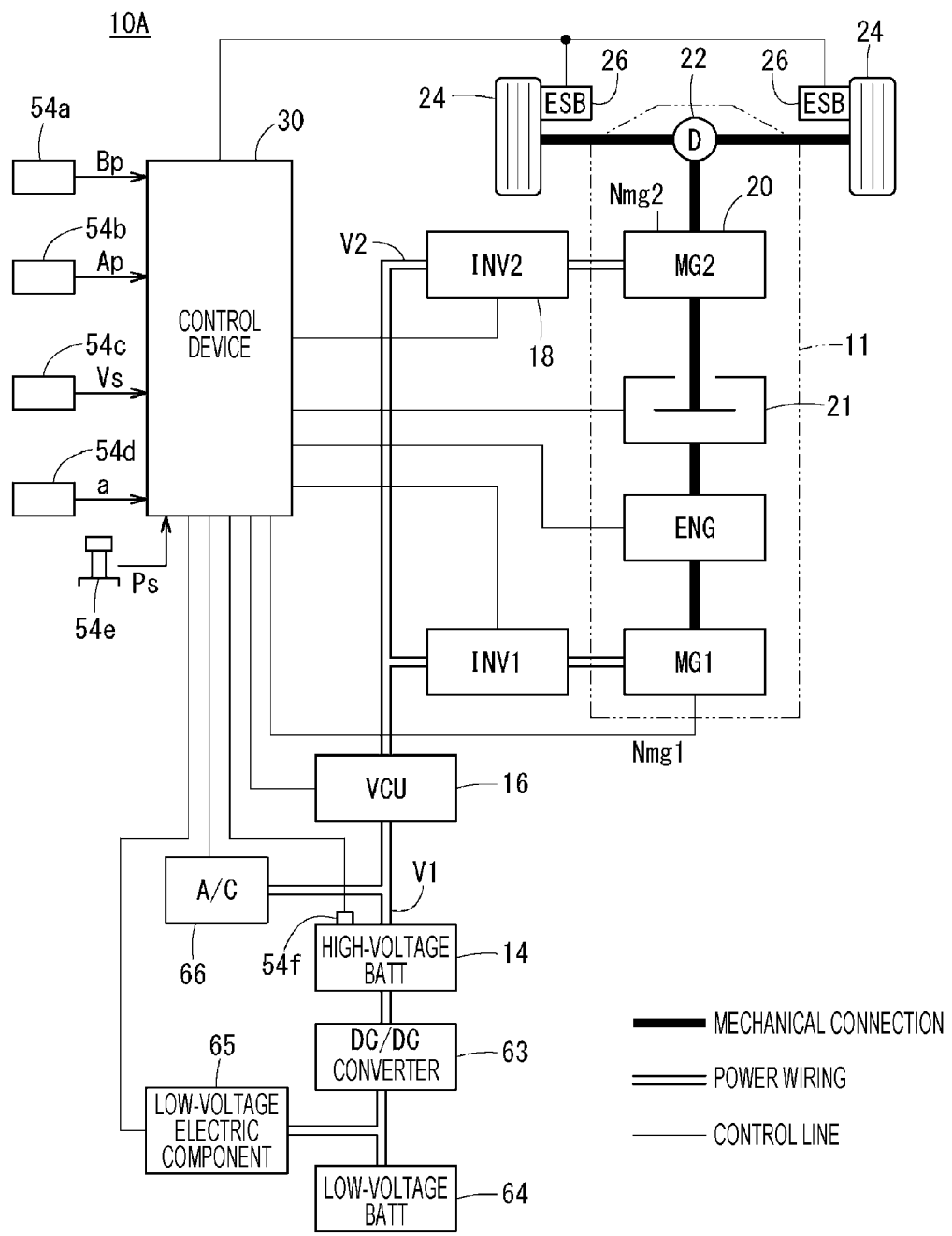
FIG. 15 is a block diagram illustrating a schematic configuration of a vehicle (hybrid vehicle) according to a second embodiment.

FIG. 15 is a block diagram illustrating a schematic configuration of a vehicle 10A according to a second embodiment. In FIG. 15, the elements that are the same as or correspond to those illustrated in FIG. 1 are denoted by the same reference numerals and the detailed description thereof is omitted.

The vehicle 10A is a series-parallel hybrid vehicle.

The vehicle 10A basically includes an engine ENG serving as an internal combustion engine, a motor-generator-including transmission 11, the high-voltage battery 14, the low-voltage battery 64, the VCU 16, an inverter (first inverter) INV1, an inverter (second inverter) INV2, the ESBs 26, and the control device 30. The control device 30 may be divided like the one illustrated in FIG. 1, but is integrated here into a single unit for the purpose of avoidance of complexity and convenience of understanding.

The motor-generator-including transmission 11 includes a motor generator (first motor generator) MG1 (electric motor) and a motor generator (second motor generator) MG2 (power generator), each of which is a three-phase permanent magnet synchronous motor that is vector-controlled, a driving system 21, and the reduction gear (D) 22.

The driving system 21 includes a clutch that directly connects the engine ENG and the reduction gear 22 to each other, and a transmission or fixed gear interposed between the clutch and the reduction gear 22.

In FIG. 15, a bold solid line represents a mechanical connection, a double solid line represents power wiring, and a thin solid line represents a control line.

A brief description will be given of a known operation of the vehicle 10A, which is a series-parallel hybrid vehicle. The vehicle 10A is capable of driving in (a) EV drive mode, (b) engine drive mode, and (c) hybrid drive mode.

In (a) EV drive mode, the driving system 21 is disengaged, the engine ENG and the motor generator MG1 are stopped, and the wheels 24 are driven by the power of the high-voltage battery 14 through the motor generator MG2.

In (b) engine drive mode, the driving system 21 is engaged, and driving is basically performed by the engine ENG with the motor generators MG1 and MG2 being stopped. Driving by the motor generator MG2 may be added or power generation by the motor generator MG1 may be performed according to a situation.

In (c) hybrid drive mode, the driving system 21 is disengaged, and a series hybrid function is implemented. In this case, basically, the engine ENG is operated in a high-efficiency area. The motor generator MG1 is driven as a power generator by using rotative power of the engine ENG, and the motor generator MG2 is driven by using the power thereof. The surplus power generated by the motor generator MG1 is used for charging the high-voltage battery 14. On the other hand, if an output required for driving is large and if engine drive alone is inefficient, the motor generator MG2 is driven by also using the power of the high-voltage battery 14.

In the second embodiment, a description will be given under the assumption that (c) hybrid drive mode is used.

The motor generator MG2 (motor generator 20) for driving the vehicle 10A is driven (powered operation) as an electric motor by being supplied with power from at least one of the high-voltage battery 14 and the motor generator MG1, and generates the power (torque) to be used by the vehicle 10A to drive.

The power generated by the motor generator MG2 is transmitted to the wheels 24 through the reduction gear 22.

The motor generator MG2 basically operates as a power generator that performs regenerative operation at the time of braking the vehicle 10A. Thus, at the time of braking the vehicle 10A, the power generated by the motor generator MG2 and the motor generator MG1 is supplied to the high-voltage battery 14 and/or the electrically operated air compressor 66.

The VCU 16 basically controls the voltage V2 and performs step-up/step-down control between a secondary side where the voltage V2 is generated and a primary side where the voltage V1 is generated (high-voltage battery 14 side).

Figure 16:
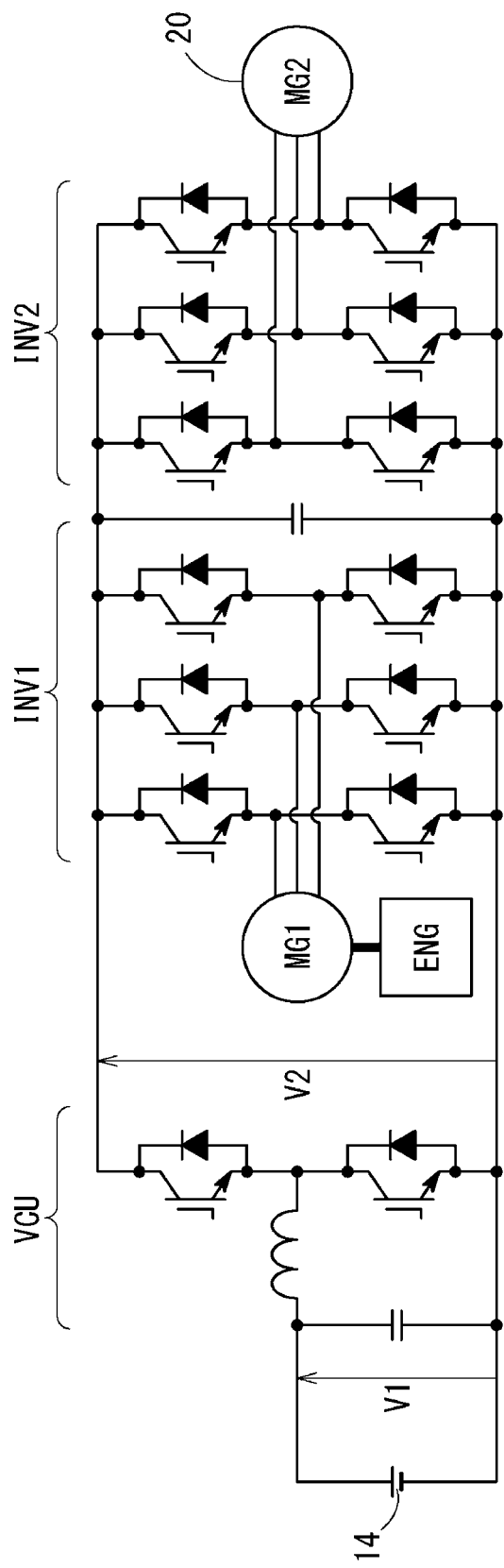
FIG. 16 is an electric circuit diagram illustrating a detailed example configuration of a VCU, a first inverter, and a second inverter illustrated in FIG. 15.

FIG. 16 is a schematic electric circuit diagram illustrating the connection relationship among the high-voltage battery 14, the VCU 16, the inverter INV1, the inverter INV2, the motor generator MG1, and the motor generator MG2.

As illustrated in FIG. 16, the VCU 16 includes a smoothing capacitor, an inductor, and two switching elements of upper and lower arms. The VCU 16 performs ON/OFF switching of the two switching elements of upper and lower arms by using, as an input voltage, the voltage V1 output by the high-voltage battery 14, and thereby increases the voltage V1 to generate the voltage V2 on the output side. Also, the VCU 16 performs ON/OFF switching of the two switching elements of upper and lower arms by using, as an input voltage, the voltage V2 output by the inverter INV1 or the inverter INV2, and thereby decreases the voltage V2 to generate the voltage V1 on the output side.

The voltage V2 is equal to the voltage V1 when the two switching elements of the VCU 16 do not perform ON/OFF switching and the upper switching element is in an ON state whereas the lower switching element is in an OFF state.

The inverter INV1 converts the AC voltage generated by the motor generator MG1 through driving of the engine ENG, to the voltage V2 which is a DC voltage.

The inverter INV2 converts the voltage V2 to an AC voltage and supplies a three-phase current to the motor generator MG2 (powered operation). Also, the inverter INV2 converts the AC voltage generated by the motor generator MG2 at the time of braking the vehicle 10A to the voltage V2 (regenerative operation).

Referring back to FIG. 15, the ESBs 26 brake the vehicle 10A by using a hydraulic system that is controlled by an electric motor (not illustrated) in accordance with the brake depression degree Bp, which is an amount of operation of a brake pedal 54a (a depression degree sensor is incorporated therein) performed by the driver of the vehicle 10A.

In FIG. 15, various sensors, such as a brake depression degree sensor that is incorporated in the brake pedal 54a and that outputs a brake depression degree Bp corresponding to the degree of depression of the brake pedal 54a, an accelerator position sensor that is incorporated in an accelerator pedal 54b and that outputs an accelerator position Ap corresponding to the degree of depression of the accelerator pedal 54b, a vehicle speed sensor 54c that outputs a vehicle speed Vs, an acceleration sensor 54d that outputs an acceleration a, a shift position sensor that is incorporated in a shift lever 54e and that outputs a shift position Ps, an SOC sensor 54f that outputs a state of charge SOC of the high-voltage battery 14, and a sensor such as a resolver that detects rotation positions θ and motor rotation rates Nmg2 and Nmg1 of the motor generators MG2 and MG1, are connected to the control device 30.

The control device 30 performs vector control of the inverter INV1, the motor generator MG1, the inverter INV2, the motor generator MG2, and the VCU 16, and also controls the engine ENG, the ESBs 26, and the electrically operated air compressor 66 and the low-voltage electric component 65 serving as auxiliary machines.

Operation

Next, a description will be given of a control operation performed by the control device 30 of the vehicle 10A according to the second embodiment that basically has the above-described configuration, with reference to the flowchart in FIG. 17.

Figure 6:
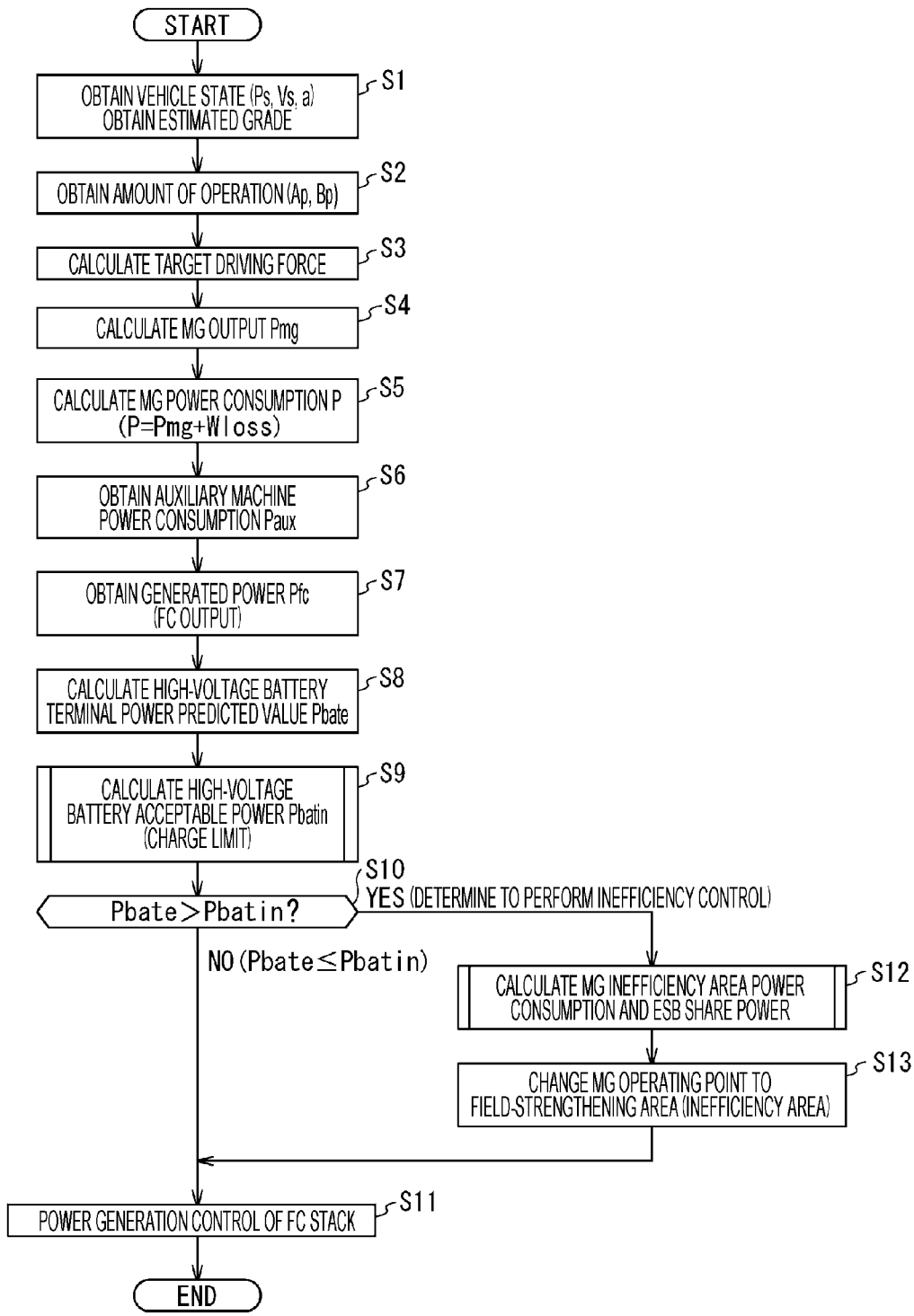
FIG. 6 is a flowchart for describing an operation of inefficiency control of a vehicle according to the first embodiment.
Figure 17:
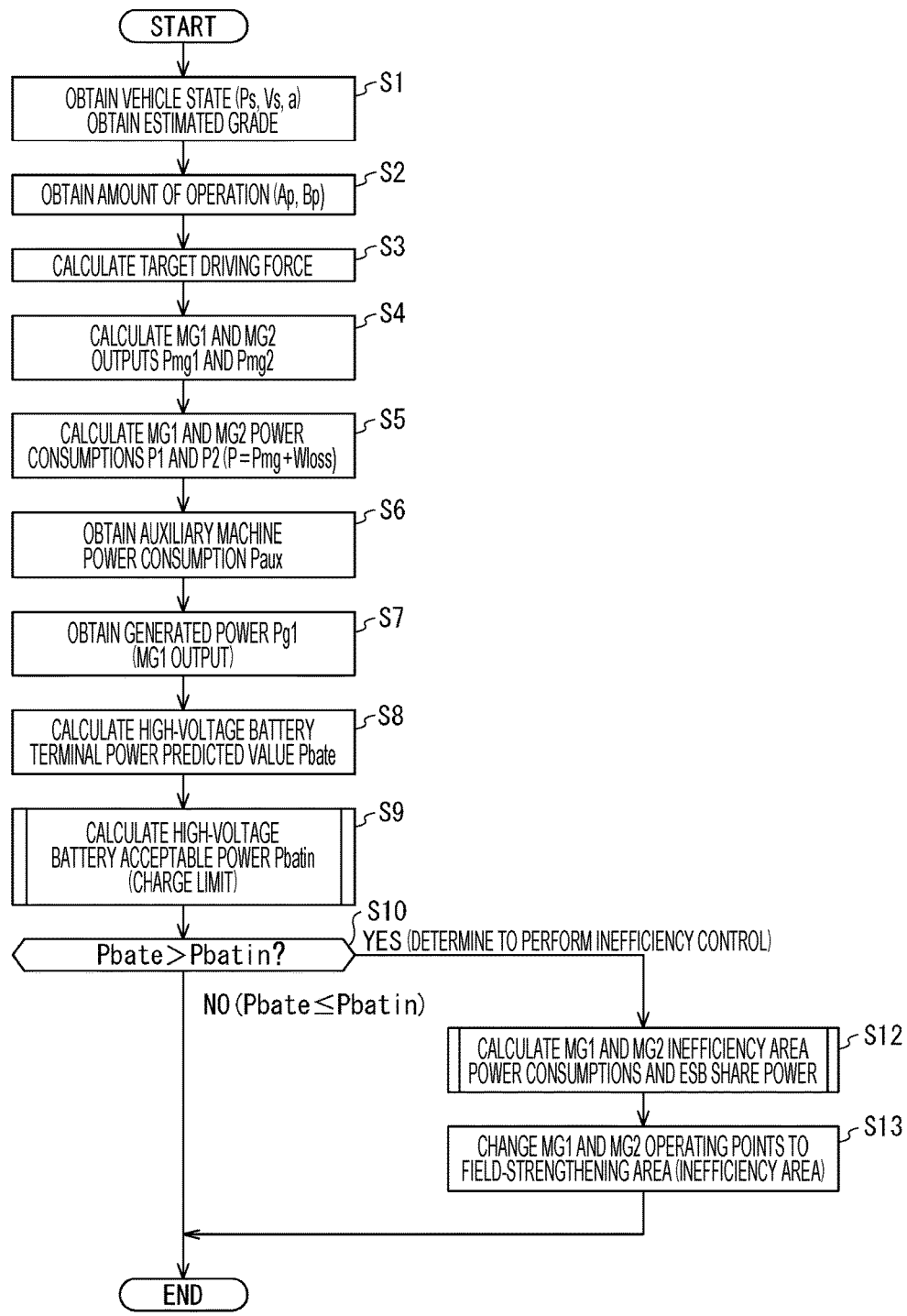
FIG. 17 is a flowchart for describing an operation of inefficiency control of a vehicle according to the second embodiment.

The process in the flowchart of FIG. 17 is similar to that in the flowchart of FIG. 6. The corresponding steps are denoted by the same step numbers and the detailed description thereof is omitted. In the second embodiment, inefficiency control is performed also on the motor generator MG1 for power generation if necessary, as well as on the motor generator MG2 for driving.

In this case, in step S4, outputs Pmg1 and Pmg2 of the motor generators MG1 and MG2 are calculated. The output of the motor generator MG1 is calculated on the basis of the generated torque T and angular speed (engine speed) of the motor generator MG1, as in expression (14). If the outputs Pmg1 and Pmg2 are negative values, they represent regenerative outputs.

In step S5, power consumptions P1 and P2 of the motor generators MG1 and MG2 are calculated on the basis of expression (15). If the power consumption P=P1 is a negative value, that represents a generated power P1. If the power consumption P=P2 is a negative value, that represents a regenerative power P2.

In step S7, a generated power Pg1 of the motor generator MG1 is obtained.

Furthermore, in step S8, a DC terminal power predicted value of the high-voltage battery 14 (high-voltage battery terminal power predicted value) Pbate is calculated by using the following expression (19). The power flowing into the high-voltage battery 14 (charging power) is represented by −, whereas the power flowing out of the high-voltage battery 14 (discharging power) is represented by +.

$$Pbate = P + Pg1 + Paux \quad (19)$$

Description of Operation According to Second Embodiment with Reference to Time Charts Hereinafter, a description will be given of an operation of switching between conventional efficiency control and inefficiency control (field-strengthening control) in step S13 with reference to the time charts in FIG. 18 and so forth.

For example, in the case of obtaining a regenerative braking force from the motor generator MG2 by operating the brake pedal 54a (brake operation), overcharge of the high-voltage battery 14 can be avoided by increasing the power consumed by inefficiency control operation of the motor generator MG2. In the time charts described below, an example of applying inefficiency control in the motor generator MG1 in addition to the motor generator MG2 is described.

Figure 18:
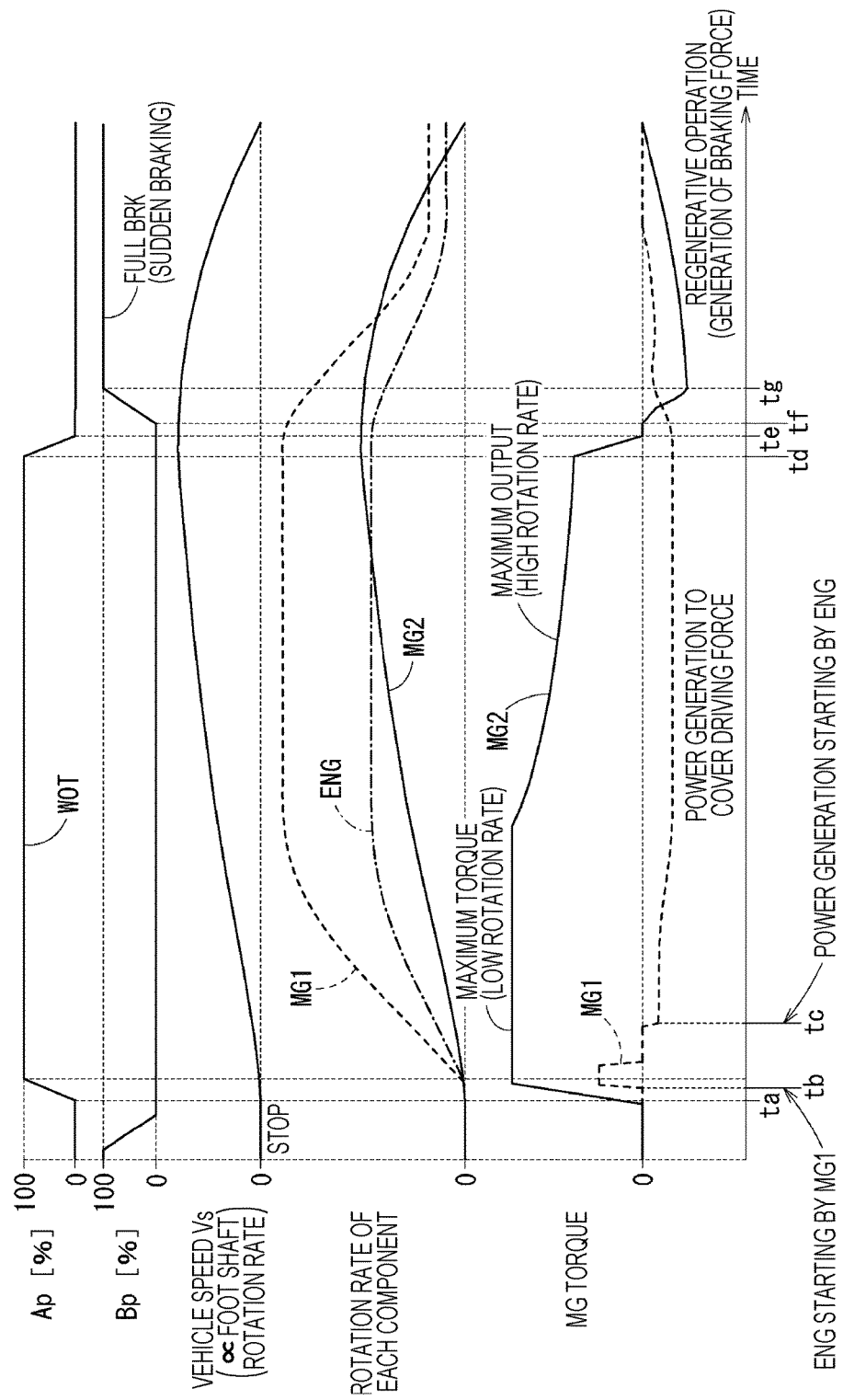
FIG. 18 is a first time chart for describing an operation of inefficiency control of a vehicle according to a comparative example of the second embodiment.

FIG. 18 is a time chart for describing an operation of inefficiency control according to a comparative example of the vehicle 10A according to the second embodiment and describing a state where overcharge of the high-voltage battery 14 is likely to occur.

Figure 19:
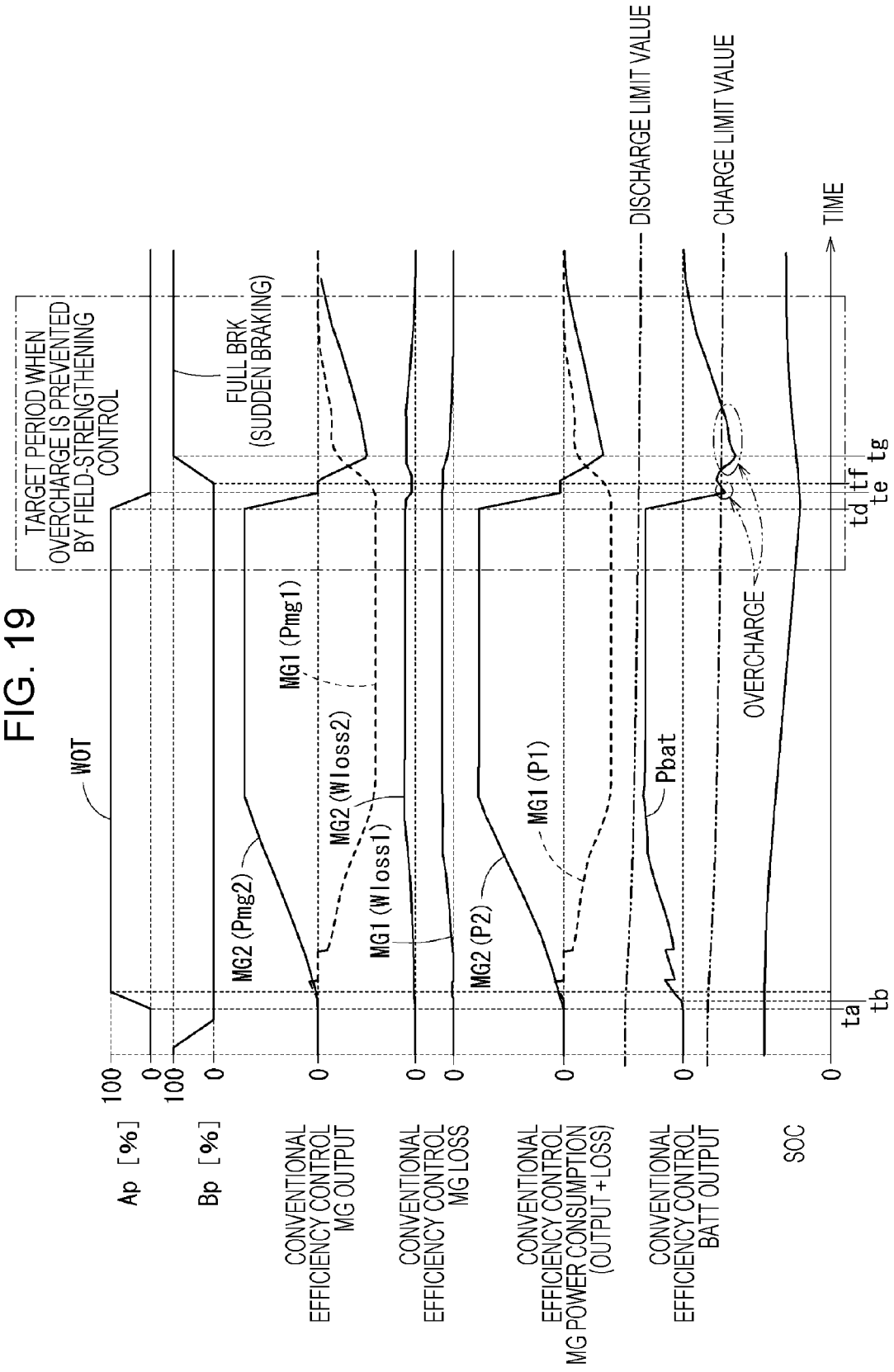
FIG. 19 is a second time chart for describing the operation of inefficiency control of the vehicle according to the comparative example of the second embodiment.

FIG. 19 is a time chart for describing a state where overcharge occurs in a case where inefficiency control (field-strengthening control) according to the comparative example in conventional efficiency control does not occur.

Figure 20:
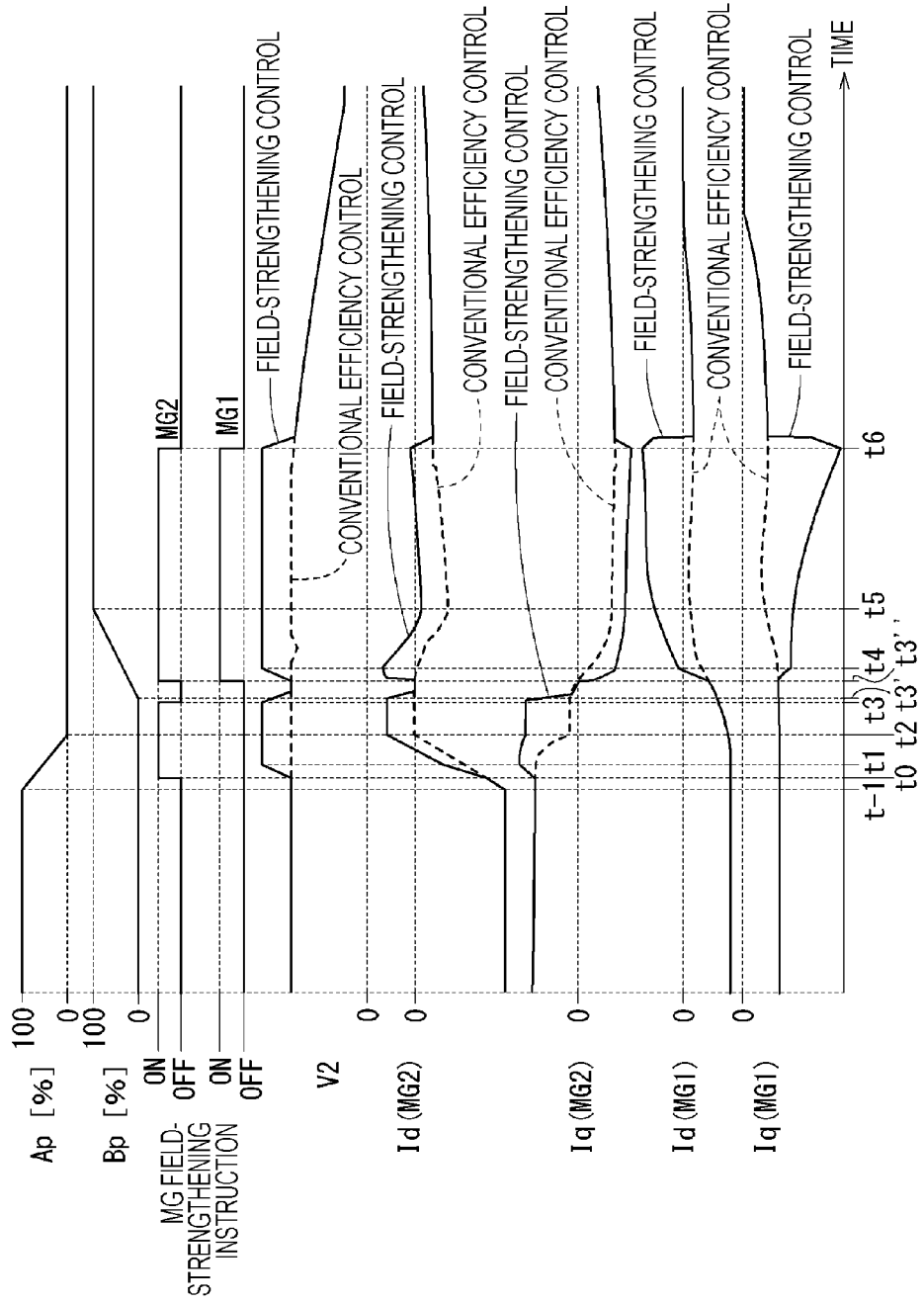
FIG. 20 is a first time chart for describing an operation of inefficiency control of a vehicle according to the second embodiment.

FIGS. 20 and 21 are time charts for describing a state where the occurrence of overcharge can be prevented by inefficiency control (field-strengthening control) of the vehicle 10A according to the second embodiment.

In FIGS. 18 to 21, the same waveforms are illustrated regarding the accelerator position Ap and the brake depression degree Bp.

In FIGS. 18 and 19, the vehicle 10A is stopped with a vehicle speed Vs=0 at time ta. The vehicle speed Vs is proportional to the rotation rate of the foot shaft, which is the rotation rate of the wheels 24). In this state, when the accelerator pedal 54b is put to the metal (wide open throttle: a full-throttle state in driving a vehicle) at time ta, the control device 30 sets the torque T of the motor generator MG2 to a maximum torque (low rotation rate) as illustrated in FIG. 18, and also causes the motor generator MG1 to operate as a cranking motor to crank the engine ENG at time tb.

After the engine ENG has been cranked, the motor generator MG1 is driven by the engine ENG and power generation for producing a driving force is started at time tc, and the power generation continues. For a certain period from time tc, the torque of the motor generator MG2 is controlled to be the maximum torque (low rotation rate).

From time td to time tg in FIGS. 18 and 19, release of the accelerator pedal 54b and depression of the brake pedal 54a are detected, that is, a full-throttle acceleration state (the accelerator position Ap=100%) changes to a full braking state where the brake depression degree Bp is the maximum (100%).

From around time tf, the motor generator MG2 performs regenerative operation (a braking force is generated).

In FIG. 19, a loss Wloss2 of the motor generator MG2 in conventional efficiency control is added to the output Pmg2 of the motor generator MG2 in conventional efficiency control to obtain a power consumption P2 of the motor generator MG2 in conventional efficiency control. Also, a loss Wloss1 of the motor generator MG1 in conventional efficiency control is added to the output Pmg1 of the motor generator MG1 in conventional efficiency control to obtain a power consumption P1 of the motor generator MG1 in conventional efficiency control (a negative value, which represents generated power).

As can be understood from FIG. 19, the battery terminal power Pbat, which is a battery output (BATT output) in conventional efficiency control, does not exceed a discharge limit value in the WOT period. During the WOT period, the state of charge SOC gradually decreases.

When the accelerator pedal 54b is released in a so-called WOT state at time td, the output Pmg2 of the motor generator MG2 rapidly decreases. Furthermore, when the brake pedal 54a is depressed to the floor (full braking) from time tf to time tg, the regenerative power of the output Pmg2 of the motor generator MG2 (the power consumption P2 of a negative value in FIG. 19) rapidly increases during the period.

Thus, the battery terminal power Pbat related to the regenerative power exceeds the charge limit value around time td and around time tg, which may degrade the high-voltage battery 14.

Thus, as indicated in the time region surrounded by a two-dot chain line in FIG. 19, a period including a period from time td to time tg is regarded as a target period when overcharge is prevented by inefficiency control (field-strengthening control).

FIGS. 20 and 21 are enlarged diagrams of the rectangular time region surrounded by a two-dot chain line in FIG. 19 when inefficiency control (field-strengthening control) is performed (the target period when overcharge is prevented by field-strengthening control), and illustrate a result of preventing overcharge in which the battery terminal power Pbat does not exceed (not fall below) the charge limit value.

FIGS. 22 and 23 illustrate the overview of characteristic maps (characteristic graphs) 200 and 202 that are created and stored in advance so that the control device 30 judges whether or not to perform inefficiency control.

In the characteristic map 200 illustrated in FIG. 22, variables of the function f in the horizontal axis are the motor rotation rates Nmg1 and Nmg2 of the motor generators MG1 and MG2, the generated power P1, and the power consumption P2. Variables of the function f in the vertical axis are the accelerator position Ap and an accelerator position change amount ΔAp/Δt, or the brake depression degree Bp and a brake depression degree change amount ΔBp/Δt.

As can be understood from the characteristic map 200, higher motor rotation rates Nmg1 and Nmg2, a larger generated power P1, a larger power consumption P2, a larger accelerator position Ap, and a larger accelerator position change amount ΔAp/Δt correspond to an inefficiency control operation area, that is, inefficiency control is performed. The opposite case corresponds to an inefficiency control operation unnecessary area, that is, a conventional efficiency control area where inefficiency control is not necessary (normal control area).

That is, as the output Pmg2 of the motor generator MG2 and the output Pmg1 of the motor generator MG1 (in this case, generated power) become larger at the time of judgment (in the latter half of WOT in FIG. 19), surplus power (regenerative power of the motor generator MG2, surplus of power generated by the motor generator MG1) is more likely to be generated and the possibility of performing inefficiency control increases in the subsequent transition state (the state from time td to time tg in FIG. 19).

In the characteristic map 202 in FIG. 23, when the battery terminal power Pbat is on the discharge side (Pbat>0), for example, when the battery terminal power Pbat=Pb3, Pb4 and when a battery terminal power change amount Pbat/Δt to a steep charge side (<<0) is predicted, the state corresponds to an inefficiency control operation area, and it is judged that inefficiency control needs to be performed.

In the characteristic map 202, when the battery terminal power Pbat=Pb2, it is judged that the battery terminal power Pbat is likely to become closer to the overcharge limit value even if the battery terminal power change amount Pbat/Δt on the charge side is small relative to the change amount when Pbat=Pb3. Thus, it is judged that inefficiency control needs to be performed.

Furthermore, in the characteristic map 202, when the battery terminal power Pbat is on the charge side deeper than the battery terminal power Pb1 (Pbat<Pb1), it is judged that inefficiency control needs to be performed even if the value of the battery charge change amount ΔPbat/Δt is zero.

Referring back to the time charts in FIGS. 20 and 21, the control device 30 sets a field-strengthening instruction (flag) of the motor generator MG2 at time t0 on the basis of the characteristic maps 200 and 202 because the accelerator position Ap rapidly decreases from 100% to 80% (the accelerator position change amount ΔAp/Δt, which is an amount of change in the accelerator position Ap, is large), the power consumption P2 of the motor generator MG2 and the generated power P1 of the motor generator MG1 are large, the battery terminal power Pbat (discharge) is large, and a large battery terminal power change amount Pbat/Δt on the charge side is detected in a predetermined short time (from time t-1 to time t0).

In this case, as illustrated in FIG. 20, inefficiency control (field-strengthening control) is performed on the motor generator MG1 by increasing the voltage V2, increasing the d-axis current Id in the positive direction, and increasing the q-axis current Iq in the period from time t0 to time t3 when the vehicle 10A is decreasing the speed. Accordingly, in the period from time t0 to time t3 in FIG. 21, the loss Wloss2 (heat loss) of the motor generator MG2 increases, which indicates that the motor generator MG2 is absorbing surplus power. Thus, charging with the battery terminal power Pbat (BATT output) beyond the charge limit value is prevented (not over the charge limit value).

In the period from time t3' to time t3" in FIG. 20, when the brake pedal 54a is depressed (ΔBp/Δt is large) after the accelerator position Ap becomes 0% (the accelerator pedal is released) after WOT and when the brake depression degree Bp changes from 0% to 20%, it is predicted that a large regenerative power (Pmg2<0) will be generated by the motor generator MG2 on the basis of the characteristic map 200. Thus, at time t3", the field-strengthening instruction (flag) of the motor generator MG2 is set and the instruction is kept until time t6.

In this case (full braking after WOT), it is judged that it is impossible to consume the surplus power by the loss of the motor generator MG2. Thus, the field-strengthening instruction (flag) is also set to the motor generator MG1 and is kept from time t3" to time t6.

In this way, during the period from time t3" to time t6, the d-axis current Id is increased in the positive value direction compared to conventional efficiency control, and the q-axis current Iq is increased in the negative value direction compared to conventional efficiency control.

In the period from time t3" to time t6 when the regenerative power of the motor generator MG2 is large, the regenerative power is consumed as surplus power by the motor generators MG1 and MG2, and a decrease in the battery terminal power Pbat to under the charge limit value (charging beyond the charge limit value) is prevented.

FIGS. 24A, 24B, 25A, 25B, 26A, 26B, 27A, 27B, 28A, 28B, 29A, and 29B respectively illustrate the current vectors in field-strengthening control at time t1, time t2, time t3, time t4, time t5, and time t6 in FIGS. 20 and 21.

A dot (black circle) represents a current vector according to the second embodiment and a circle (white circle) represents a current vector according to the related art.

Figure 24B:
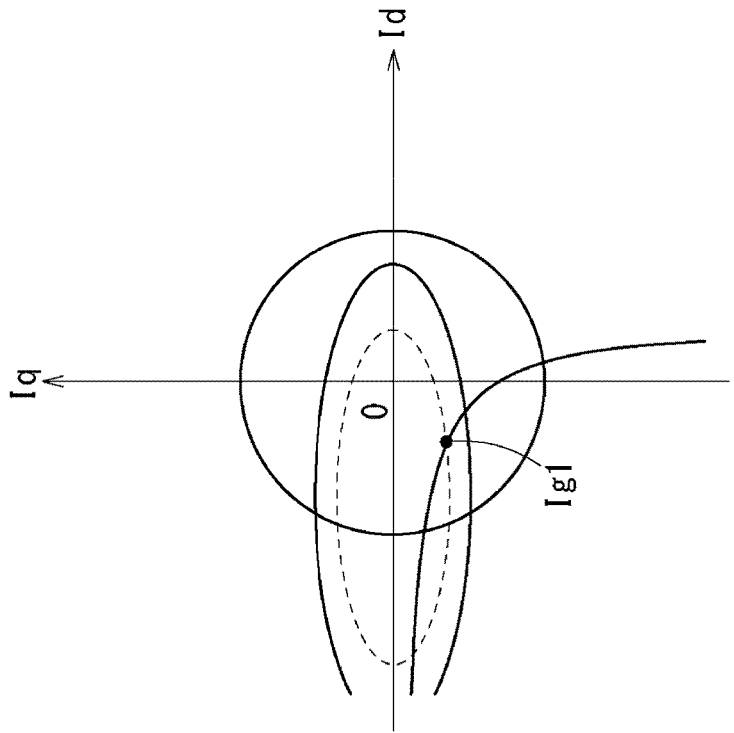
FIGS. 24A and 24B are Id-Ip plane diagrams respectively illustrating operating points of individual motor generators at time t1 in FIGS. 20 and 21.
Figure 24A:
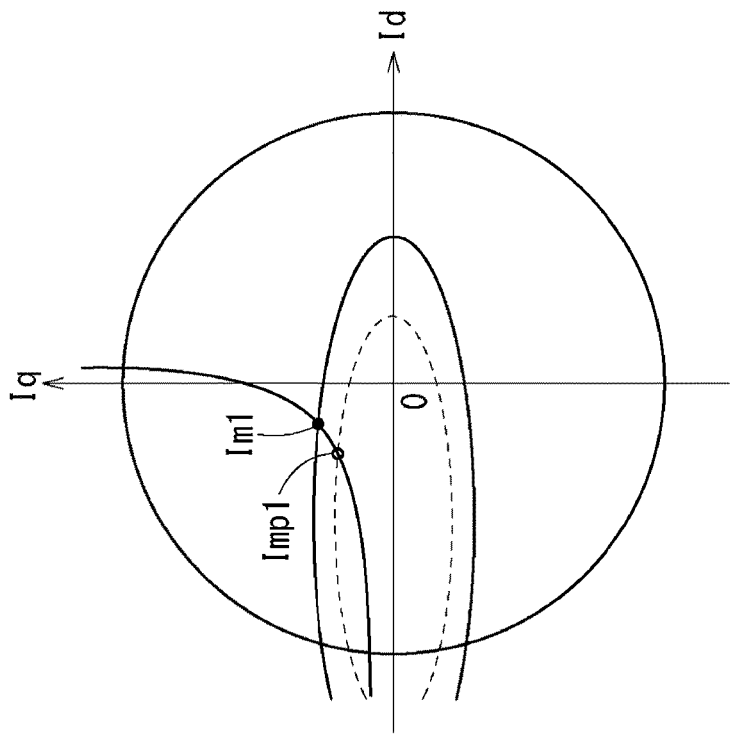

As illustrated in FIG. 20, in response to the field-strengthening instruction (flag) of the motor generator MG2 that is set at time t1 when the accelerator position Ap is decreasing, the voltage V2 is increased, and the operation range based on the limit voltage Vom is expanded from a broken-line ellipse to a solid-line ellipse as illustrated in FIG. 24A (time t1).

At this time, the current vector is moved from an operating point Imp1 according to the related art represented by a circle (white circle) to an operating point Im1 represented by a dot (black circle) along the constant torque curve in accordance with a simultaneous increase in the d-axis current Id and the q-axis current Iq in the positive direction. Since the movement is along the constant torque curve, a speed reduction G is the same as in the related art, and the product performance (ride quality) of the vehicle 10A is maintained to be equivalent to that of the related art.

At time t1, as illustrated in FIG. 24B, regarding the motor generator MG1, the voltage V2 is increased and the operation range based on the limit voltage Vom is expanded from a broken-line operation range to a solid-line operation range. However, since inefficiency control (field-strengthening control) is not performed, the operating point is set (held) at an operating point Ig1 represented by a dot in the operation range indicated by the broke line.

Figure 25B:
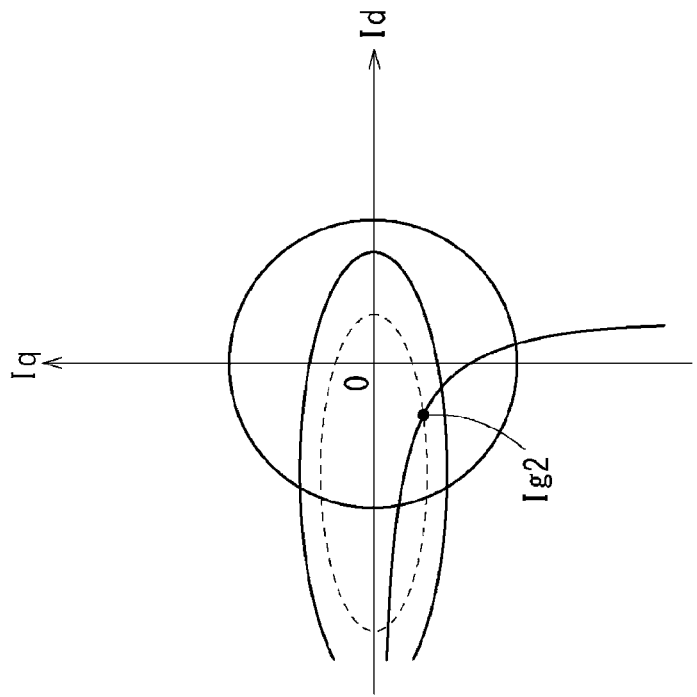
FIGS. 25A and 25B are Id-Ip plane diagrams respectively illustrating operating points of individual motor generators at time t2 in FIGS. 20 and 21.
Figure 25A:
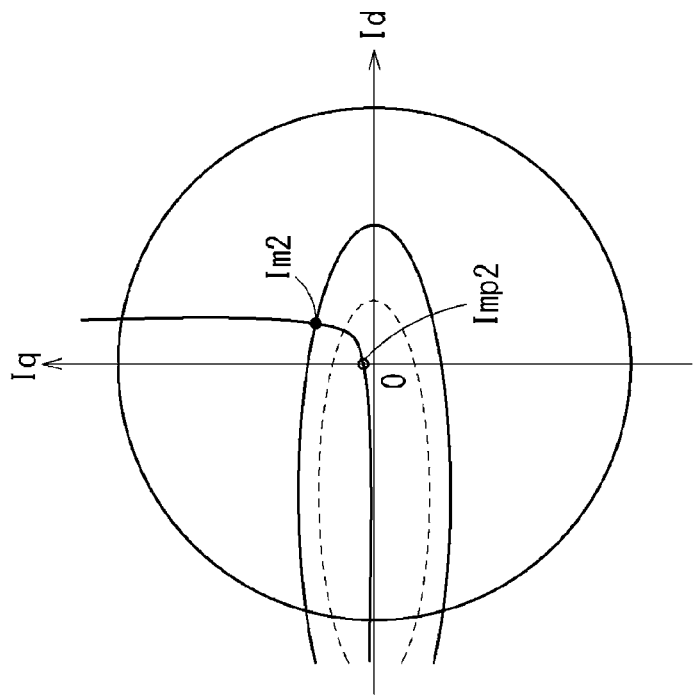

Around time t2 when the accelerator position Ap becomes zero in FIG. 20, since inefficiency control (field-strengthening control) is performed on the motor generator MG2, an operating point Imp2 at the position where Id=0 according to the related art is moved to an operating point Im2 where Id>0 as illustrated in FIG. 25A. At this time, an operating point Ig2 of the motor generator MG1 is at substantially the same position as the operating point Ig1 (FIG. 24B).

Figure 26B:
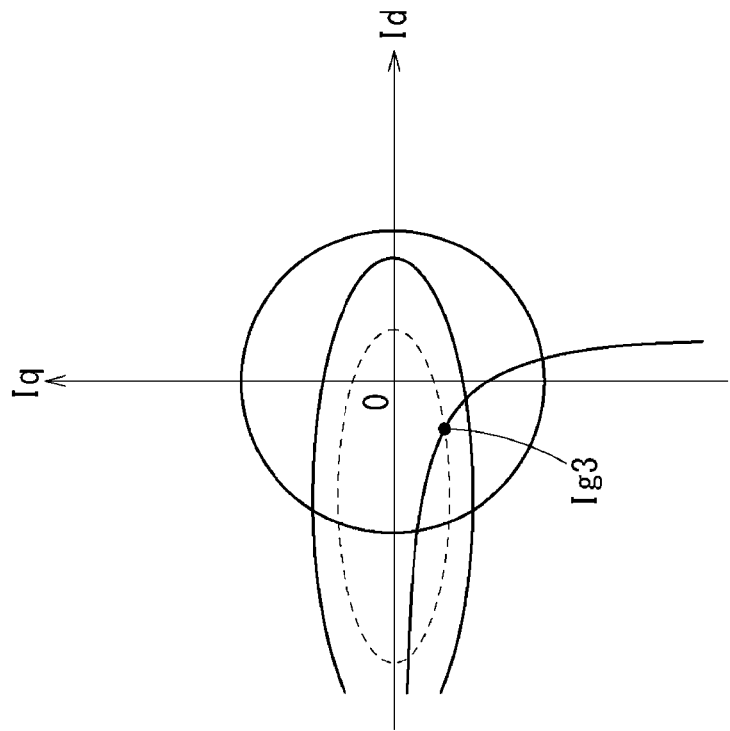
FIGS. 26A and 26B are Id-Ip plane diagrams respectively illustrating operating points of individual motor generators at time t3 in FIGS. 20 and 21.
Figure 26A:
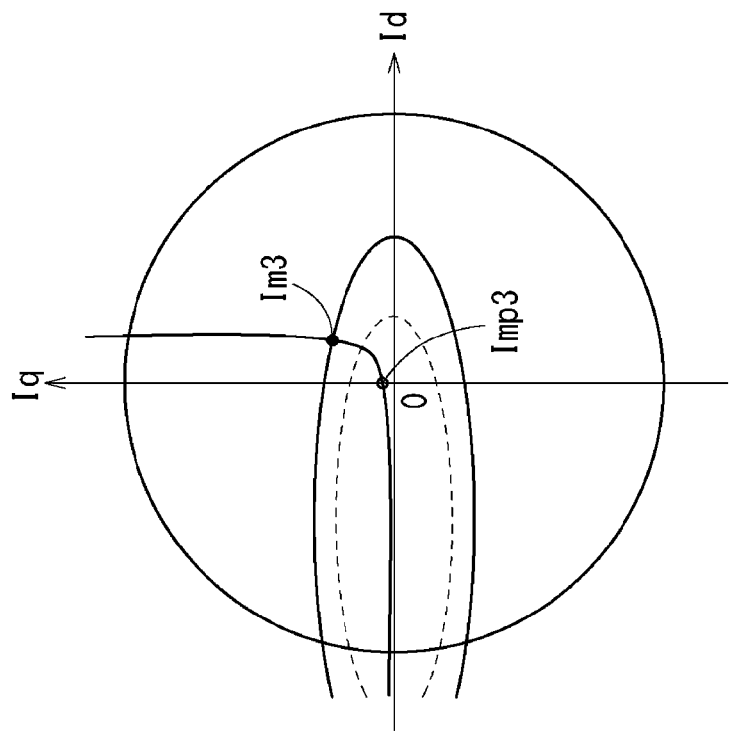

Likewise, at time t3, the operating point of the motor generator MG2 is Im3=Im2, Imp3=Imp2 as illustrated in FIG. 26A, whereas the operating point of the motor generator MG1 is Ig3≈Ig2 as illustrated in FIG. 26B.

Figure 27B:
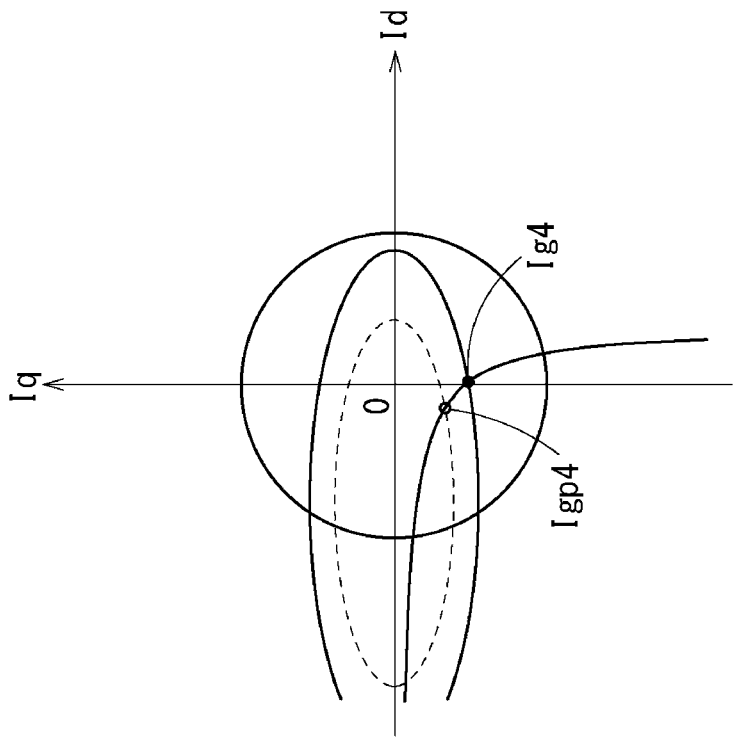
FIGS. 27A and 27B are Id-Ip plane diagrams respectively illustrating operating points of individual motor generators at time t4 in FIGS. 20 and 21.
Figure 27A:
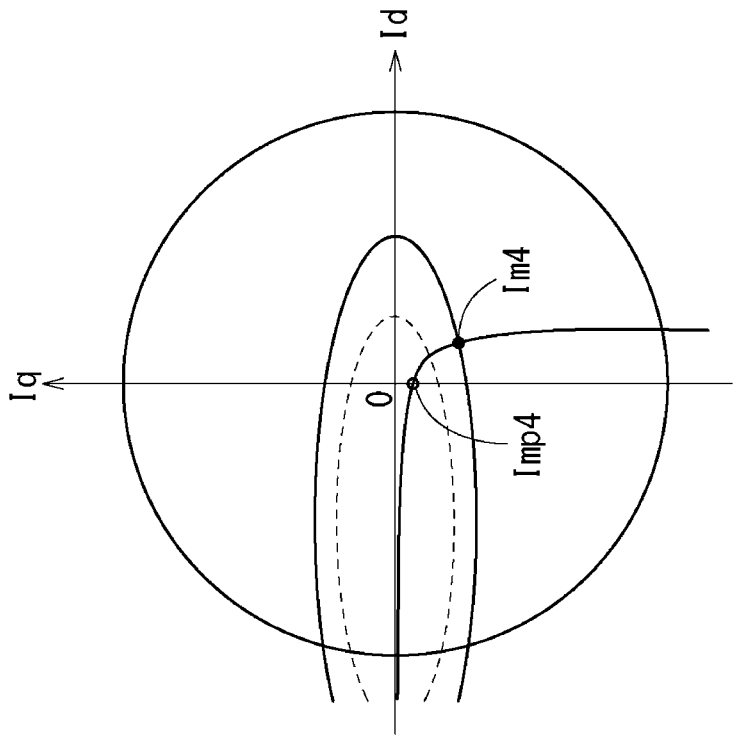

At time t4, the motor generators MG2 and MG1 perform regenerative operation, and inefficiency control (field-strengthening control) is performed. The operating points thereof are an operating point Im4 (an operating point Imp4 according to the related art) and an operating point Ig4 (an operating point Igp4 according to the related art), as illustrated in FIGS. 27A and 27B.

Figure 28B:
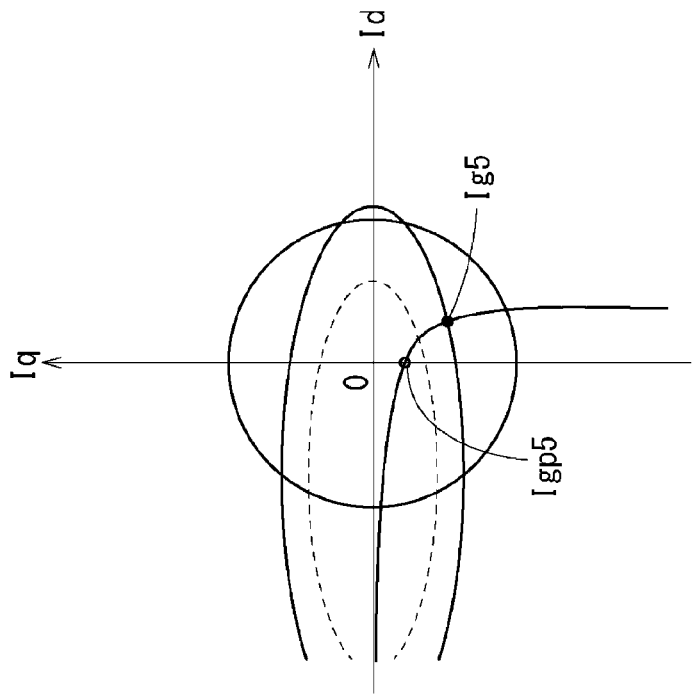
FIGS. 28A and 28B are Id-Ip plane diagrams respectively illustrating operating points of individual motor generators at time t5 in FIGS. 20 and 21.
Figure 28A:
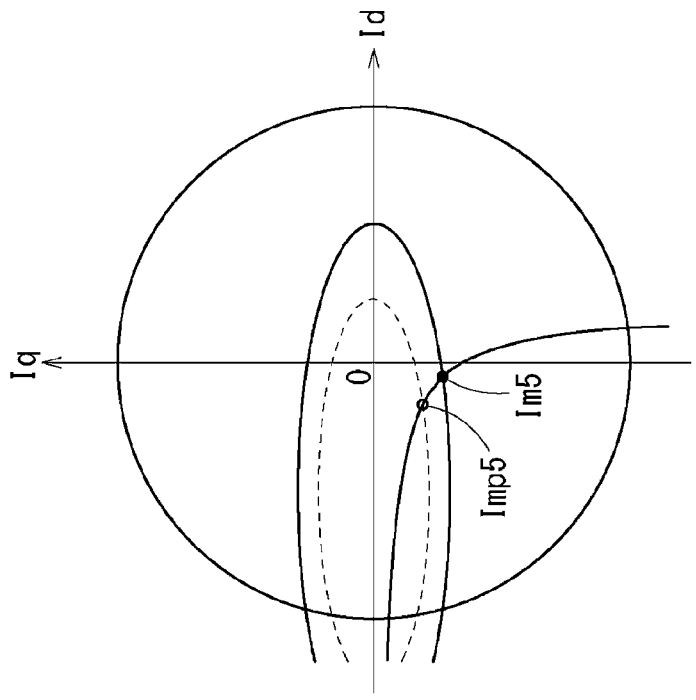

At time t5, the motor generators MG2 and MG1 perform regenerative operation, and inefficiency control (field-strengthening control) is performed. The operating points thereof are an operating point Im5 (an operating point Imp5 according to the related art) and an operating point Ig5 (an operating point Igp5 according to the related art), as illustrated in FIGS. 28A and 28B.

Figure 29A:
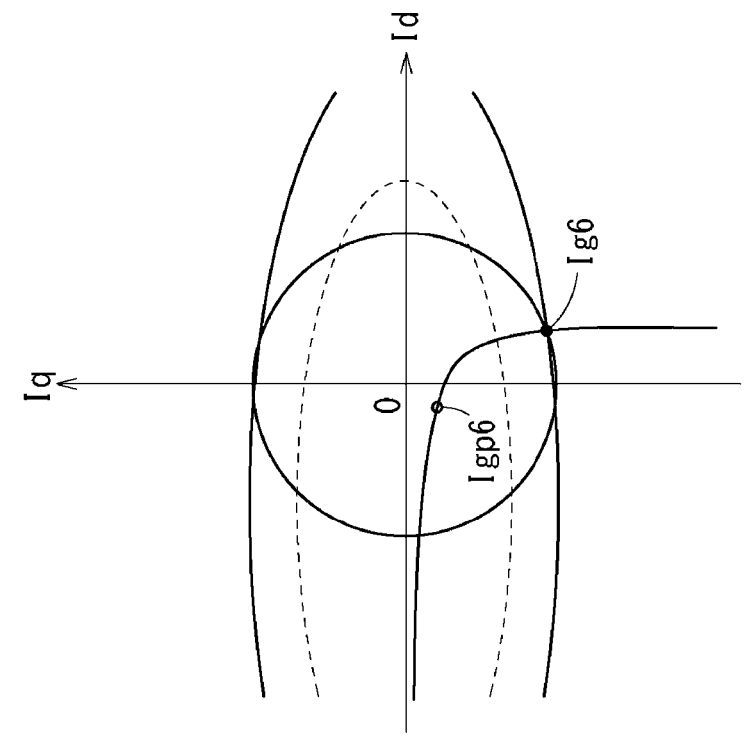
FIGS. 29A and 29B are Id-Ip plane diagrams respectively illustrating operating points of individual motor generators at time t6 in FIGS. 20 and 21.
Figure 29B:
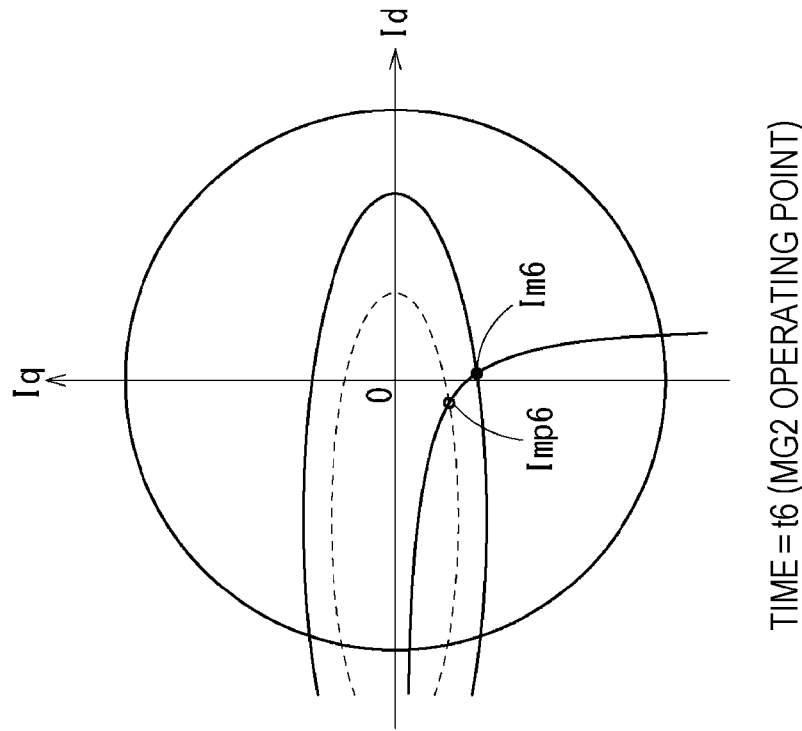

At time t6 in FIGS. 20 and 21, the motor ration rates Nmg1 and Nmg2 (angular speeds w) of the motor generators MG1 and MG2 decrease, the respective operation ranges are expanded, and the operating point of the motor generator MG2 is an operating point Im6 (an operating point Imp6 according to the related art) as illustrated in FIG. 29A. The operating point of the motor generator MG1 is an operating point Ig6 (an operating point Igp6 according to the related art).

Conclusion of First and Second Embodiments

In the present technique, a rotating electric machine with high responsivity (motor generator MG2 or motor generators MG2 and MG1) is used as a power buffer device by absorbing part of surplus power generated due to a response delay of the vehicle 10 or 10A (delay in power generation control of the FC stack 40 for a driving force requested by the vehicle or delay in communication between ECUs) by controlling (inefficiency control) the rotating electric machine (motor generator MG2 or motor generators MG2 and MG1).

According to this technique, the life and durability of both the power generation device such as the FC stack 40 and the high-voltage battery 14 can be increased, and the size of an accessory device such as a surge absorbing capacitor and a fuel shut-off device of the FC unit 12 can be decreased. Furthermore, the potential of the FC stack 40 and the high-voltage battery 14 can be sufficiently exploited and the merchantability of the vehicle can be increased.

Specifically, when the driving force requested by the vehicle changes more quickly than a response of power generation control and when there is no allowance in the power accepted by the high-voltage battery 14, the motor generator MG2 or the motor generators MG2 and MG1 may be operated with inefficiency so as to maintain the accuracy of power balance control without an influence on vehicle behavior.

The vehicles 10 and 10A according to the above-described first and second embodiments include, as illustrated in FIGS. 1 and 15, the high-voltage battery 14 serving as a power storage device, the FC stack 40 or the motor generator MG1 serving as a power generation device (an electric power generator), the motor generator 20 (MG2) serving as a rotating electric machine driven by the power of the high-voltage battery 14 and the high-voltage battery 14 and/or the motor generator MG1, and the control device 30.

When surplus power is generated by the power generation device (FC stack 40 or motor generator MG1) due to a response delay of the power generation device (around time t13 in FIG. 13, around time tf to time tg in FIG. 18) and when the high-voltage battery 14 has charge restrictions (when the battery terminal power Pbat is on the full-charge side) in a case of decreasing the generated power Pfc of the FC stack 40 in the vehicle 10 and decreasing an amount of power generated by the motor generator MG1 in the vehicle 10A (at time tf and thereafter in FIG. 18) in response to detection of a decrease in driving force requested by the vehicle 10 or 10A to the motor generator 20 (MG2) (a decrease in the accelerator position Ap in FIG. 14, an increase in the brake depression degree Bp after a decrease in the accelerator position Ap in FIGS. 20 and 21), the control device 30 causes the rotating electric machine (motor generator MG2 and/or motor generator MG1) to consume the surplus power by driving the rotating electric machine using a phase current (current value) Ia' (Iamin<Ia'≤Iamax in FIG. 3) different from a phase current (for example, the phase current Iamin in maximum torque/current control or maximum efficiency control illustrated in FIG. 3) that causes a current value or loss to be smallest at a time of generating a predetermined driving force (predetermined torque).

Thus, overcharge of the high-voltage battery 14 caused by surplus power (charging beyond the charge limit value) is prevented.

When the FC stack 40 is used as a power generation device, degradation of the FC stack 40 can be prevented because an output of the FC stack 40 is not suddenly shut off, unlike in Japanese Patent No. 5477101, the entire contents of which are incorporated herein by reference.

The above-described different phase current Ia' may cause the rotating electric machine (motor generator MG2 and/or motor generator MG1) to consume the surplus power by driving the rotating electric machine through field-strengthening control in which the operation range is expanded to the phase current Iamax (see FIG. 3) at the intersection point between the voltage limit ellipse based on the limit voltage Vom of the voltage V2 increased by the VCU 16 and the constant torque curve in which the predetermined torque is extended to the field-strengthening side, when the phase current of the rotating electric machine (motor generator MG2 and/or motor generator MG1) in conventional efficiency control is a phase current Iamin (predetermined driving force, see FIG. 3).

In field-strengthening control of the motor generators MG1 and MG2, the d-axis current Id has a value oriented in the positive direction compared to conventional efficiency control, and thus demagnetization of permanent magnet caused by an increase in temperature of the motor generators MG1 and MG2 can be prevented. That is, in field-strengthening control (inefficiency control), a demagnetizing field is not applied to magnet even if the temperature of the magnet increases, and a magnetic field for magnetizing the magnet is applied. Thus, the resistance to demagnetization increases. Furthermore, in field-strengthening control, the magnetic attractive force between the magnet of a rotor and the coil of an armature increases and thus movement of the rotor in both the rotation direction and axis direction can be suppressed. Accordingly, the noise and vibration (NV) characteristics of the motor generators MG1 and MG2, that is, the NV characteristics of the vehicles 10 and 10A, are improved.

An embodiment of the present disclosure may employ various configurations on the basis of the description of this specification, in addition to those of the above-described embodiments.

According to an embodiment of the present disclosure, there is provided a vehicle including a power storage device, a power generation device, a rotating electric machine that is driven by power stored in the power storage device and/or power generated by the power generation device, and a control device that controls the power generation device and the rotating electric machine. When surplus power is generated due to a response delay of the power generation device in a case of decreasing an amount of power generated by the power generation device in response to detection of a decrease in driving force requested by the vehicle to the rotating electric machine, the control device causes the rotating electric machine to consume the surplus power by driving the rotating electric machine using a phase current different from a phase current that causes a current value or loss to be smallest at a time of generating a predetermined driving force.

According to the embodiment of the present disclosure, when a driving force requested by the vehicle to the rotating electric machine decreases, that is, when a power requested to the rotating electric machine decreases, and when surplus power is generated due to a response delay of the power generation device and the power storage device has charge restrictions, control is performed so that the rotating electric machine is able to consume the surplus power by driving the rotating electric machine using a phase current different from a phase current that causes a current value or loss to be smallest at a time of generating a predetermined driving force. Accordingly, overcharge of the power storage device caused by surplus power (charging beyond the charge limit value) can be prevented.

The power generation device may be a fuel cell.

When a driving force requested by the vehicle to the rotating electric machine decreases, that is, when a power requested to the rotating electric machine decreases, the fuel cell that supplies power to the rotating electric machine is not able to decrease power generation in quick response to the decrease in requested power because of a time delay in suppling a reaction gas, and a response for decreasing power is delayed. The response delay of the fuel cell causes surplus power to be generated. When it is impossible to store the surplus power in the power storage device (when there are charge restrictions), control is performed so that the rotating electric machine is able to consume the surplus power. Thus, overcharge of the power storage device caused by surplus power (charging beyond the charge limit value) can be prevented.

In the vehicle, the power generation device may be formed of another rotating electric machine that is driven by an internal combustion engine.

According to the embodiment of the present disclosure, when a driving force requested by the vehicle to the rotating electric machine that drives the vehicle (second rotating electric machine) decreases, that is, when a power requested to the second rotating electric machine decreases, power generation of the other rotating electric machine (first rotating electric machine) that is driven by the internal combustion engine is not able to be reduced in quick response to the requested power, and a response for decreasing power is delayed. The response delay of power generation causes surplus power to be generated. When it is impossible to store the surplus power in the power storage device that has charge restrictions, control is performed so that the second rotating electric machine is able to consume the surplus power. Thus, overcharge of the power storage device caused by surplus power (charging beyond the charge limit value) can be prevented.

When surplus power is generated due to a response delay of the power generation device in a case of decreasing an amount of power generated by the power generation device in response to detection of a decrease in driving force requested by the vehicle to the rotating electric machine, the control device may cause the rotating electric machine or both the rotating electric machine and the other rotating electric machine to consume the surplus power by driving the rotating electric machine or both the rotating electric machine and the other rotating electric machine using a phase current different from a phase current that causes a current value or loss to be smallest at a time of generating the predetermined driving force.

According to the embodiment of the present disclosure, when a driving force requested by the vehicle to the rotating electric machine that drives the vehicle (second rotating electric machine) decreases, that is, when a power requested to the second rotating electric machine decreases, surplus power is generated (including the power generated by regenerative operation of the second rotating electric machine). When it is impossible to store the surplus power in the power storage device that has charge restrictions, control is performed so that the rotating electric machine (second rotating electric machine) or both the rotating electric machine (second rotating electric machine) and the other rotating electric machine (first rotating electric machine) are able to consume the surplus power. Thus, even if a larger surplus power is generated, overcharge of the power storage device caused by the larger surplus power (charging beyond the charge limit value) can be prevented.

According to the embodiment of the present disclosure, surplus power that has been generated is consumed by a rotating electric machine, and thus overcharge of a power storage device (charging beyond a charge limit value) caused by the surplus power is prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
   a power storage device;
   a power generation device;
   a rotating electric machine that is driven by power stored in the power storage device and/or power generated by the power generation device; and
   a control device that controls the power generation device and the rotating electric machine,
   wherein, when surplus power is generated due to a response delay of the power generation device in a case of decreasing an amount of power generated by the power generation device in response to detection of a decrease in driving force requested by the vehicle to the rotating electric machine, the control device causes the rotating electric machine to consume the surplus power by driving the rotating electric machine using a phase current different from a phase current that causes a current value or loss to be smallest at a time of generating a predetermined driving force.

2. The vehicle according to claim 1, wherein the power generation device is a fuel cell.

3. The vehicle according to claim 1, wherein the power generation device is formed of another rotating electric machine that is driven by an internal combustion engine.

4. The vehicle according to claim 3, wherein, when surplus power is generated due to a response delay of the power generation device in a case of decreasing an amount of power generated by the power generation device in response to detection of a decrease in driving force requested by the vehicle to the rotating electric machine, the control device causes the rotating electric machine or both the rotating electric machine and the other rotating electric machine to consume the surplus power by driving the rotating electric machine or both the rotating electric machine and the other rotating electric machine using a phase current different from a phase current that causes a current value or loss to be smallest at a time of generating the predetermined driving force.

5. A vehicle comprising:
   an electric power storage;
   an electric power generator;
   a rotating electric machine driven with electric power stored in the electric power storage and/or generated by the electric power generator to move the vehicle; and
   circuitry configured to
      calculate target driving force for the rotating electric machine,
      detect surplus electric power which is generated due to a response delay of the electric power generator upon decreasing an amount of electric power generated by the electric power generator when the target driving force decreases, and
      drive the rotating electric machine, when detecting the surplus electric power, with a phase current different from a maximum efficiency phase current with which an electric current value or electric power loss of the rotating electric machine is smallest so that the rotating electric machine consumes the surplus electric power.

6. The vehicle according to claim 5, wherein the electric power generator is a fuel cell.

7. The vehicle according to claim 5, wherein the electric power generator is another rotating electric machine to be driven by an internal combustion engine.

8. The vehicle according to claim 7, wherein the circuitry controls the rotating electric machine or both the rotating electric machine and the another rotating electric machine to consume the surplus power by driving the rotating electric machine or both the rotating electric machine and the another rotating electric machine using a phase current different from the maximum efficiency phase current when the surplus power is generated due to the response delay with which the amount of power generated by the power generator is decreased with respect to a decrease of the target driving force.

9. The vehicle according to claim 5, wherein the surplus power is higher than a charge limit value of the battery.

10. A method for controlling a vehicle, comprising:
   calculating target driving force for the rotating electric machine to move the vehicle;
   supplying electric power stored in an electric power storage and/or generated by an electric power generator to the rotating electric machine with a maximum efficiency phase current with which an electric current value or electric power loss of the rotating electric machine is smallest;
   detecting surplus electric power which is generated due to a response delay of the electric power generator upon decreasing an amount of electric power generated by the electric power generator when the target driving force decreases; and
   driving the rotating electric machine, when detecting the surplus electric power, with a phase current different from the maximum efficiency phase current so that the rotating electric machine consumes the surplus electric power.

11. The control method according to claim 10, wherein the surplus power is higher than a charge limit value of a battery.

* * * * *